US008341518B2

(12) United States Patent　　(10) Patent No.: US 8,341,518 B2
Hirai　　(45) Date of Patent: Dec. 25, 2012

(54) REPORT FORMAT SETTING METHOD AND APPARATUS, AND DEFECT REVIEW SYSTEM

(75) Inventor: Takehiro Hirai, Ushiku (JP)

(73) Assignee: Hitachi High-Technologies Corporation, Tokyo (JP)

( * ) Notice: Subject to any disclaimer, the term of this patent is extended or adjusted under 35 U.S.C. 154(b) by 17 days.

(21) Appl. No.: 12/901,954

(22) Filed: Oct. 11, 2010

(65) Prior Publication Data

US 2011/0029906 A1　Feb. 3, 2011

Related U.S. Application Data

(63) Continuation of application No. 11/699,063, filed on Jan. 29, 2007, now Pat. No. 7,836,398.

(30) Foreign Application Priority Data

Feb. 28, 2006　(JP) .................................. 2006-052620

(51) Int. Cl.
　　*G06F 17/00*　　(2006.01)
(52) U.S. Cl. ........................................ 715/243; 715/255
(58) Field of Classification Search .................. 715/243, 715/255
See application file for complete search history.

(56) References Cited

U.S. PATENT DOCUMENTS

| 6,292,582 | B1 * | 9/2001 | Lin et al. ........................ 382/149 |
| 6,438,438 | B1 | 8/2002 | Takagi et al. |
| 2003/0059105 | A1 | 3/2003 | Hirose et al. |
| 2004/0119749 | A1 | 6/2004 | Luque |
| 2004/0126005 | A1 | 7/2004 | Duvdevani et al. |
| 2004/0167802 | A1 | 8/2004 | Takada et al. |
| 2004/0218806 | A1 | 11/2004 | Miyamoto et al. |
| 2005/0058335 | A1 | 3/2005 | Lin et al. |
| 2005/0168731 | A1 | 8/2005 | Shibuya et al. |

(Continued)

FOREIGN PATENT DOCUMENTS

JP　　10-307623　　11/1998

(Continued)

OTHER PUBLICATIONS

Japanese Office Action issued in Japanese Patent Application No. JP 2006-052620 dated Mar. 1, 2011.

(Continued)

*Primary Examiner* — Doug Hutton, Jr.
*Assistant Examiner* — Andrew McIntosh
(74) *Attorney, Agent, or Firm* — McDermott Will & Emery LLP

(57) ABSTRACT

Generated is a template edition screen on which to display components of a report as modules by OSD by use of icons. One of the icons is selected by use of a pointing device including a mouse. By a drag-and-drop operation, the icon is placed at a desired position in an output format setup area formed in the same screen. The icon is set in a desired size by another drag-and-drop operation. Details of a module shown by the icon thus placed can be set up in a detail setup area in the same screen. Information on a format thus set up is retained as a template through a retention function, and accordingly can be used easily by simply calling the information. Moreover, the retained template can be edited as well. This makes it possible not only to create a new template, but also to modify an existing template.

7 Claims, 22 Drawing Sheets

U.S. PATENT DOCUMENTS

| | | |
|---|---|---|
| 2005/0190957 A1 | 9/2005 | Cai et al. |
| 2005/0198602 A1* | 9/2005 | Brankner ............................ 716/8 |
| 2005/0222797 A1* | 10/2005 | Kolman ........................... 702/119 |
| 2005/0226405 A1 | 10/2005 | Fukatsu et al. |
| 2006/0009942 A1 | 1/2006 | Keck et al. |
| 2006/0010416 A1 | 1/2006 | Keck et al. |
| 2006/0036394 A1 | 2/2006 | Chen et al. |
| 2006/0239536 A1 | 10/2006 | Shibuya et al. |
| 2007/0133862 A1 | 6/2007 | Gold et al. |
| 2008/0260235 A1 | 10/2008 | Cai et al. |
| 2009/0105990 A1 | 4/2009 | Shibuya et al. |
| 2009/0297019 A1 | 12/2009 | Zafar et al. |

FOREIGN PATENT DOCUMENTS

| | | |
|---|---|---|
| JP | 11-096384 A | 4/1999 |
| JP | 2001-014479 | 1/2001 |
| JP | 2002-163666 | 6/2002 |
| JP | 2003-098112 | 4/2003 |
| JP | 2004-047939 | 2/2004 |
| JP | 2004-317343 A | 11/2004 |

OTHER PUBLICATIONS

Shankar, N.G. et al., "Defect Detection on semiconductor wafer surfaces," Dec. 25, 2004, pp. 1-10.

Chou, Paul B. et al., "Automatic defect classification for semiconductor manufacturing," Machine Vision and Application 9: pp. 201-214, 1997.

Entire prosecution history of U.S. Appl. No. 11/699,063, filed Jan. 29, 2007 to Hirai et al., entitled "Report Format Setting Method and Apparatus, Defect Review System."

Japanese Office Action issued in Japanese Patent Application No. JP 2006-052620 dated Oct. 26, 2010.

* cited by examiner

REPORT FORMAT SETTING METHOD AND APPARATUS, AND DEFECT REVIEW SYSTEM

RELATED APPLICATIONS

This application is a Continuation of U.S. application Ser. No. 11/699,063, filed on Jan. 29, 2007 now U.S. Pat. No. 7,836,398, claiming priority of Japanese Patent Application No. 2006-052620, filed on Feb. 28, 2006, the entire contents of each of which are hereby incorporated by reference.

BACKGROUND OF THE INVENTION

1. Field of the Invention

The present invention relates to a report format setup method, a report format setup apparatus and a defect reviewing system which makes it possible to make setups freely. Specifically, the present invention relates to an apparatus which, like a semiconductor device defect reviewing apparatus, is expected to eclectically output a variety of pieces of information, such as spatial patterns of defects, images representing various defect types, EDX (Energy Dispersive X-ray) spectra and results of classifying defects, in a plurality of formats depending on a situation.

2. Description of the Prior Art

For the purpose of securing high yield in production of semiconductor devices, it is important that defects, which occur in a production process, be found at an early time, and that countermeasures be accordingly applied to the defects. These years, fabrication of semiconductor devices in increasingly fine sizes causes an increasing variety of defects which adversely affect the yield. This increases information required for examining countermeasures.

A semiconductor device defect reviewing apparatus is an apparatus through which to acquire such a variety of pieces of information, and is capable of outputting spatial patterns of defects on a wafer, various types of electron microscopic images, optical microscopic images, EDX spectrum images, results of classifying defects, defect size distributions, and the like. The spatial patterns of defects on a wafer will be hereinafter referred to as a "wafer map." The various types of electron microscopic images will be hereinafter referred to as "SEM images," and SEM stands for Scanning Electron Microscope. The various types of optical microscopic image will be hereinafter referred to as "OM images." The EDX spectrum images will be hereinafter referred to as "EDX results." The results of classifying defects will be hereinafter referred to as ADC results, and ADC stands for Automatic Defect Classification. Note that, although ADC originally means automatic defect classification, defect classification results, inclusive of manual defect classification results, will be generically referred to as "ADC results" in this description. The defect size distributions will be referred to as "size distributions."

In addition, the SEM images include: images taken by upper detectors (hereinafter referred to as "Top images); images taken by left-side detectors (hereinafter referred to as Left images); images taken by right-side detectors (hereinafter referred to as Right images); and images taken at tilted angles (hereinafter referred to as Tilt images). Other types of information required for examining countermeasures includes: accompanying information including description of magnifications, optical conditions and the like of each of the various types of SEM images; and memo information including necessary information described by a user. Out of these various types of information, a user selects information which he/she needs, and thus examines countermeasures against defects.

However, information effective for examining countermeasures is different from one object defect to another. For example, information in a form which allows images to be grasped at a glance like listed thumbnail images of multiple defects may be effective in some cases, and detailed information in a form of enlarged SEM images, enlarged EDX results and the like may be effective in other cases. Moreover, in many cases, a format used for a report is different from one company to another, from one job to another in the charge of a user, and from one defect type to another which to focus on. A semiconductor device defect reviewing apparatus or an apparatus, which is capable of editing information outputted from the semiconductor device defect reviewing apparatus to be edited, is capable of creating a report relatively easily in a case where an output format peculiar to the apparatus is similar to a format which the user wishes to use. In a case where, however, an output format particular to the apparatus is widely different from a format which the user withes to use, the user has to create a report by doing such things as using software commercially available. This takes labor. Japanese Patent Application Laid-open Publication No. Hei. 11-96384 has disclosed an apparatus, which has an SEM image and accompanying information outputted in a report, as a method for making such laborious work easier. Japanese Patent Application Laid-open Publication No. 2004-317343 has disclosed a system which sets up measurement conditions on the basis of a format for outputting a report as the same method.

SUMMARY OF THE INVENTION

Japanese Patent Application Laid-open Publication No. Hei. 11-96384 relates to a measurement image document creating apparatus which creates a measurement image document by combining data on a measurement image with data on its accompanying text data. In some cases, the measurement image document creating apparatus is effective for creating a report in the form of a combination of the SEM image and its accompanying information. However, the apparatus is not effective for the other cases, for example, for creating a report in the form of a combination of a wafer map, a Top image, a Left image, a Right image, a Tilt image, an OM image, an EDX result, an ADC result, a size distribution, accompanying information, memo information and the like. Moreover, even if the apparatus is capable of combining an SEM image with accompanying information, the apparatus is not capable of dealing with a user's needs for changing formats freely.

Japanese Patent Application Laid-open Publication No. 2004-317343 relates to a measurement system which obtains needed diagrams and the like, and which thus creates a report on a measurement result. This system sets up measurement conditions on the basis of an output format. However, the patent document has disclosed nothing specific about setup of output formats.

The present invention has been made with the foregoing problems taken into consideration. An object of the present invention is to provide an apparatus and a method which make it possible for a user to set up a report format freely, and to easily create a report in the desired format.

The present invention is characterized most chiefly in that: modules constituting a report are represented with icons, respectively; an icon needed is selected through a pointing function of a mouse or the like; the icon needed is placed at a desired position by a drag-and-drop operation; the size of the icon needed is changed through the pointing function of the mouse or the like; and thereby a format is freely set up.

To this end, a report format setup method according to the present invention is that for creating a review report which reports a review result. The method is characterized by including: an edition screen generating step of generating an edition screen which includes icons and an output format setup area, the icons respectively representing components of a review result to be outputted as a report, and the output format setup area representing a medium on which to output the report; an icon controlling step of moving and placing the icons on the edition screen depending on operations of a pointing device; and a format editing step of editing a report output format which instructs that the components of the review result represented by the icons arranged in the output format setup area should be arranged respectively at positions on the medium, the positions corresponding to locations of the respective icons in the output format setup area.

In addition, a defect reviewing system according to the present invention is that for carrying out a process of reporting a result of a review performed by a defect reviewing apparatus which acquires an image by focusing on a defective part in a workpiece. The system is characterized by including: edition screen generating means for generating an edition screen which includes icons and an output format setup area, the icons respectively representing components of a review result to be outputted as a report on an output information process, and the output format setup area representing a medium on which to output the report; icon controlling means for moving and placing the icons on the edition screen depending on operations of a pointing device; and format editing means for editing a report output format which instructs that the components of the review result represented by the icons arranged in the output format setup area should be arranged respectively at positions on the medium, the positions corresponding to locations of the respective icons in the output format setup area.

The present invention makes it possible for a user to freely change formats for a review report with less labor, and to thus improve work efficiency. In addition, the present invention makes it possible to easily register and reuse examples of formats as templates. Accordingly, the present invention brings about an effect that apparatuses coping with various formats can be provided to not only users but also apparatus developers and makers with lower development costs.

PREFERRED EMBODIMENTS OF THE PRESENT INVENTION

Descriptions will be provided for an embodiment of the present invention on the basis of the drawings.

Figure 1:
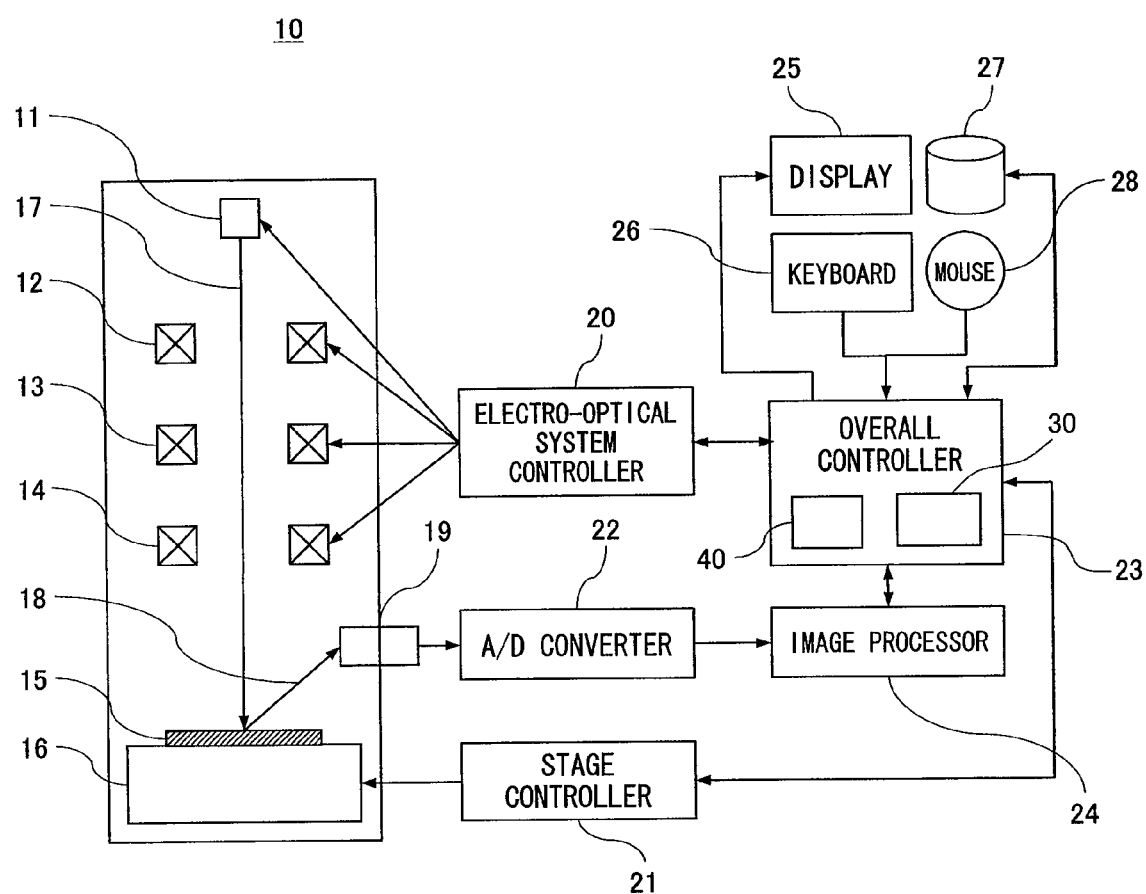
FIG. 1 is a diagram of a system configuration of a semiconductor device defect reviewing apparatus to which a report format setup method according to an embodiment of the present invention is applied.

FIG. 1 is a diagram of a system configuration of a semiconductor device defect reviewing apparatus to which a report format setup method according to an embodiment of the present invention is applied.

As shown in FIG. 1, a semiconductor device defect reviewing apparatus 10 includes an electro-optical system, an electro-optical control system, an overall controller 23, storage 27 and input/output means. The electro-optical system includes: an electron gun 11 for emitting a beam of electrons 17; a convergent lens 12 for converging the emitted beam of electrons; a deflector 13 for deflecting and thus irradiating the beam of electrons 17; an objective lens 14 for converging the deflected beam of electrons in order to irradiate the deflected beam of electrons on a workpiece 15; a stage 16 on which the workpiece 15 as an object of review is placed; and a secondary particles detector 19 for detecting secondary electrons or reflection electrons which are produced from surfaces of the workpiece on which the beam of electrons 17 has been irradiated. The electro-optical control system includes: an electro-optical system controller 20 for controlling the irradiation of the beam of electrons 17 on the workpiece 15; a stage controller 21 for controlling the position of the stage 16 on which the workpiece 15 is placed; an A/D converter 22 for applying signal processing to a detected signal which has been detected by the secondary particles detector 19, and thus converting the processed signal to a digital signal; and an image processor 24 for classifying an image of a defect on a basis of a reference image (benchmark image), the defect being detected as the secondary electrons or reflection electrons from the surfaces of this workpiece 15. The overall controller 23 is that for doing things such as controlling the entire apparatus including the electro-optical control system and performing a review process on a basis of a result of the image process performed by the image processor 24. The storage 27 does things such as accumulating the result of the image process. The input/output means include a display 25, a keyboard 26 and a mouse 28.

In the semiconductor device defect reviewing apparatus 10, the beam of electrons 17 is emitted from the electron gun 11. The emitted beam of electrons 17 is converged by the convergent lens 12, and the resultant beam of electrons 17 is deflected by the deflector 13. Thereafter, the deflected beam of electrons 17 is converged by the objective lens 14, and the resultant beam of electrons 17 is irradiated on the workpiece 15. In this occasion, secondary particles 18, such as secondary electrons and reflection electrons, are produced from the workpiece 15 on which the beam of electrons 17 has been irradiated, depending on the shape, and the material, of the workpiece 15. The secondary particles 18 thus produced are detected by the secondary particles detector 19. Subsequently, the detected second particles are converted to the digital signal by the A/D converter 22. Thereby, an SEM image is generated. Thereafter, by use of the SEM image thus generated, an image process such as defect detection is performed by the image processor 24.

In this case, operations of the convergent lens 12, the deflector 13 and the objective lens 14 are controlled by the electro-optical system beam controller 20. In addition, the position of the workpiece 15 on which the beam of electrons 17 is irradiated is controlled by the stage controller 21 through controlling an operation of the stage 16.

Based on instructions and information on setups which have been inputted through the keyboard 26 and the mouse 28, the overall controller 23 controls the storage 27, the electro-optical system controller 20, the stage controller 21, the image processor 24 and the like. Thus, the overall controller 23 does things such as performing a process of reviewing a result of the image process including the defect detection. Hence, the overall controller 23 outputs a result of the process to the display 25 and the storage 27 depending on the necessity.

In this respect, descriptions will be provided for a system of outputting the result of the review process to a network in a semiconductor device production line to which the semiconductor device defect reviewing apparatus 10 is applied.

Figure 2A:
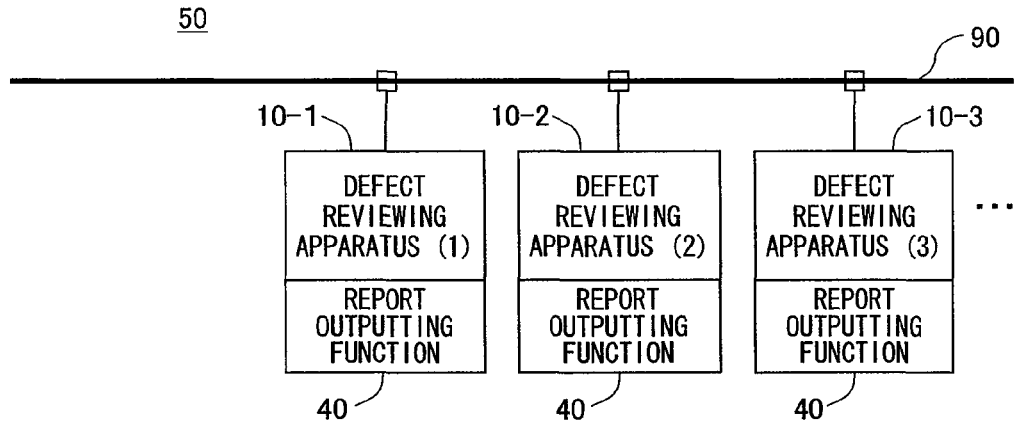
FIGS. 2A to 2C are diagrams each showing an example of a configuration of a system which enables a plurality of semiconductor device defect reviewing apparatuses provided to a semiconductor device production line to output reports respectively on results of their review processes to a network.
Figure 2B:
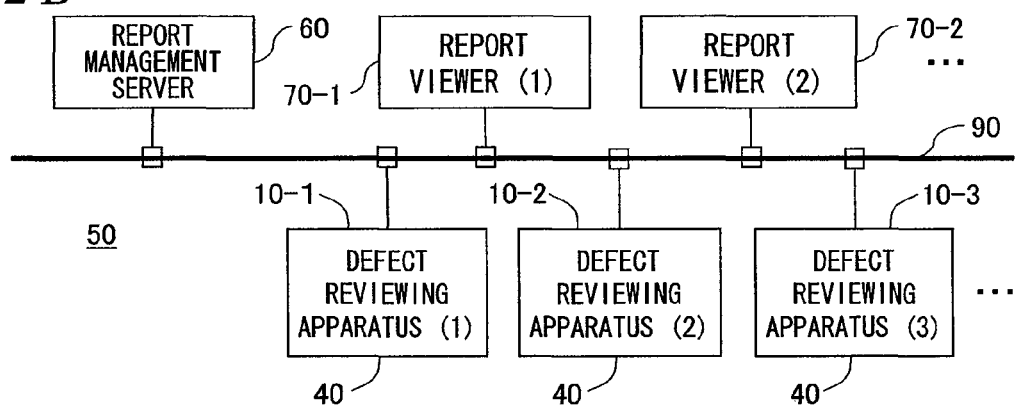
Figure 2C:
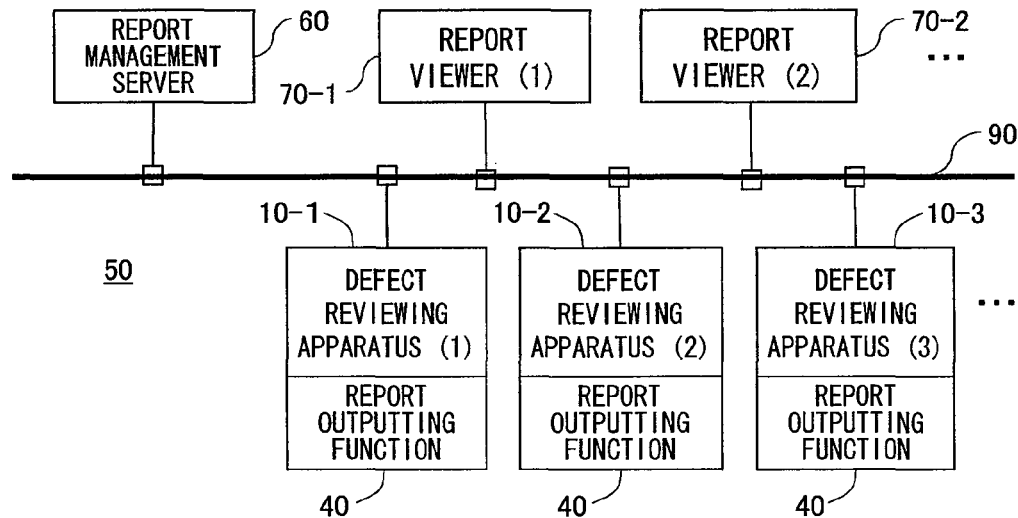

FIGS. 2A to 2C are diagrams each showing an example of a configuration of a system which enables a plurality of semiconductor device defect reviewing apparatuses provided to a semiconductor device production line to output reports respectively on results of their review processes to a network.

In the case of the system of outputting to the network as shown in FIG. 2A, the semiconductor device defect reviewing apparatuses 10-1, 10-2 and 10-3 are connected to one another through a network 90. In addition, each of the semiconductor device defect reviewing apparatuses 10-1, 10-2 and 10-3 include a report outputting function 40 for outputting a report on a result of a review process performed by itself as well as reports on results of the respective review processes performed by the other semiconductor device defect reviewing apparatuses which are connected to itself through the network 90.

The system of outputting to the network as shown in FIG. 2A can keep initial investment low in a case where only a small number of semiconductor device defect reviewing apparatuses 10-1, 10-2, 10-3, . . . are introduced to a semiconductor device production line 50. This is because, unlike a system of outputting to the network as shown in FIG. 2B, the system of outputting to the network as shown in FIG. 2A need not include a report management server 60 for managing output of reports on results of review processes performed respectively by the semiconductor device defect reviewing apparatuses 10-1, 10-2, 10-3, . . . , and because the report outputting functions 40 of the respective semiconductor device defect reviewing apparatuses 10-1, 10-2, 10-3, . . . make it possible for each of the semiconductor device defect reviewing apparatuses 10-1, 10-2, 10-3, . . . to output a report on the result of the review process performed by itself as well as the report on the results respectively of the review processes performed by the other semiconductor device defect reviewing apparatuses 10 which are connected to itself through the network 90.

FIG. 2B shows an example of a centralized management system in which, unlike the system of outputting to the network as shown in FIG. 2A, none of the semiconductor device defect reviewing apparatuses 10 include the report outputting function 40, and in which the report management server 60 connected to the network 90 manages output of the reports on the respective review processes performed by the semiconductor device defect reviewing apparatuses 10-1, 10-2, 10-3, . . . in a centralized manner. In a case where a large number of semiconductor device defect reviewing apparatuses 10-1, 10-2, 10-3, . . . are expected to be introduced in the semiconductor device production line 50 by use of the report management server 60 in this manner this brings about an advantage that the results of the respective review processes and the reports on the respective results can be managed in the centralized manner even though none of the semiconductor device defect reviewing apparatuses 10-1, 10-2, 10-3, . . . include the function of outputting the reports on the review processes. In addition, if report viewers 70-1 and 70-2 are introduced to the semiconductor device production line and are accordingly connected to the network 90, a report can be set up and outputted, as well as a previous report can be checked, with regard to the result of the review process performed by each of the semiconductor device defect reviewing apparatuses 10-1, 10-2, 10-3, . . . which are under the centralized management of the report management server 60, even at a place away from the locations where the semiconductor device defect reviewing apparatuses 10-1, 10-2, 10-3, . . . and the report management server 60 are placed.

FIG. 2C is a diagram showing an example in which each of the semiconductor device defect reviewing apparatuses 10-1, 10-2, 10-3, . . . include the report outputting function 40, and in which the report management server 60 as well as the report reviewers 70-1 and 70-2 are introduced to the semiconductor device production line. In this case, the report management server 60 enables the centralized management of the results of the respective review processes, as described above. The report reviewers 70-1 and 70-2 are capable of accessing the report management server 60 or the semiconductor device defect reviewing apparatuses 10-1, 10-2, 10-3, . . . at a location other than the location where the semiconductor device defect reviewing apparatuses 10-1, 10-2, 10-3 . . . and the report management server 60 are placed.

Descriptions will be provided next for a procedure for creating and editing a template for setting up an output format, which is concerned with output of the report on the result of the review process, and which is used for the output, citing the example in which each of the semiconductor device defect reviewing apparatuses 10 includes the report outputting function 40 in the system of outputting to the network as shown in FIG. 2A, out of the systems of outputting to the network as shown in FIGS. 2A to 2C.

In this case, as shown in FIG. 1, the overall controller 23 of the semiconductor device defect reviewing apparatus 10 includes the report outputting function 40. In addition, the overall controller 23 includes a GUI (Graphical User Interface) for operating and controlling the report outputting function 40 and a template creation manager 30 which will be described later. With the GUI, the overall controller 23 is configured to make it possible to set up various processes, including processes to be performed by the report outputting function 40, through the display screen of the display 25 by use of an OSD (On Screen Display) method.

With this configuration, the overall controller 23 includes the template creation manager 30 in addition to the report outputting function 40.

The template creation manager 30 supplies the template for setting up an output format to the report outputting function 40, and thereby controls the report outputting function 40. The template for setting up an output format is a template which the report outputting function 40 uses when the report outputting function 40 outputs the result of the review process as a review report. In addition, the template creation manager 30 creates and edits this template for setting up an output format, as well as retains and manages existing templates each for setting up an output format.

To this end, the template creation manager 30 causes a user to create or edit, with a wizard the template for setting up an output format on a control screen which is displayed on the display 25 by OSD, through the GUI function of the overall controller 23. In addition, the template creation manager 30 assigns a specific identification to each piece of information on this created or edited template for setting up an output format, as well as stores and accumulates the resultant information, as a template information file of an existing template for setting up an output format, in a template retention file in the storage 27. Thus, the template creation manager 30 retains and manages the file.

Figure 3:
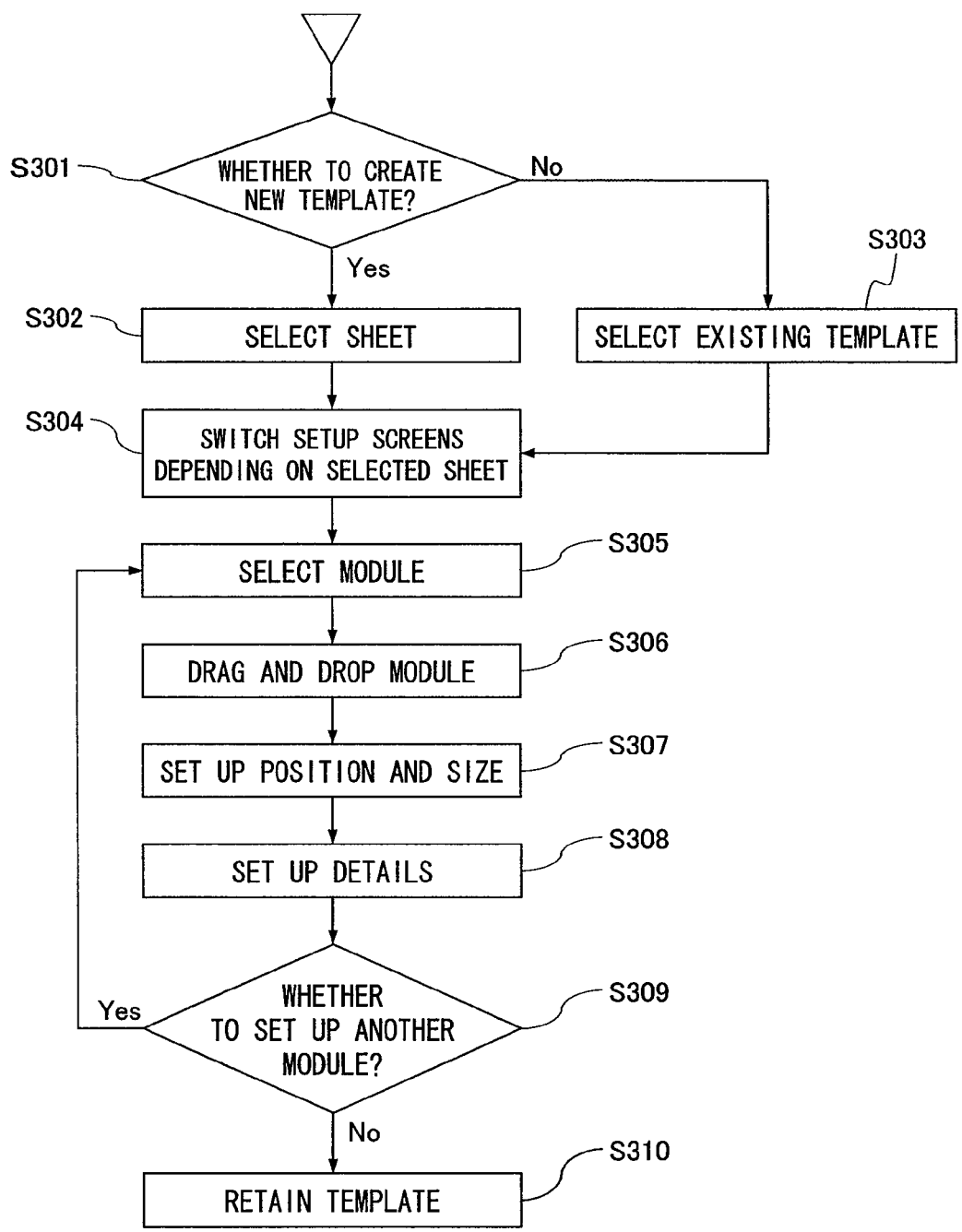
FIG. 3 is a flowchart showing a procedure with which the semiconductor device defect reviewing apparatus according to the present embodiment creates and edits a template for setting up an output format for the purpose of outputting a report.

FIG. 3 is a flowchart showing a procedure with which the semiconductor device defect reviewing apparatus according to the present embodiment creates and edits a template for setting up an output format for the purpose of outputting a report.

First of all, a setup is made for creating or editing a template for setting up an output format for the purpose of outputting a review report through a predetermined operation of the keyboard 26 or the mouse 28. Once the setup is completed, the overall controller 23 activates the template creation manager 30. Thereby, the template creation manager 30 displays a template selection screen 400 (see FIG. 4) on the display 25 by OSD through the GUI function of the overall controller 23. The template selection screen 400 is that for a template for setting up an output format which is used when the report outputting function 40 outputs the review report.

After that, on the basis of screen operating signals inputted through a pointing device of the mouse 28 or the like, the template creation manager 30 receives instructions corresponding to the screen operating signals in a GUI environment using control screens including the template selection screen 400 displayed on the display 25 by OSD.

Figure 4:
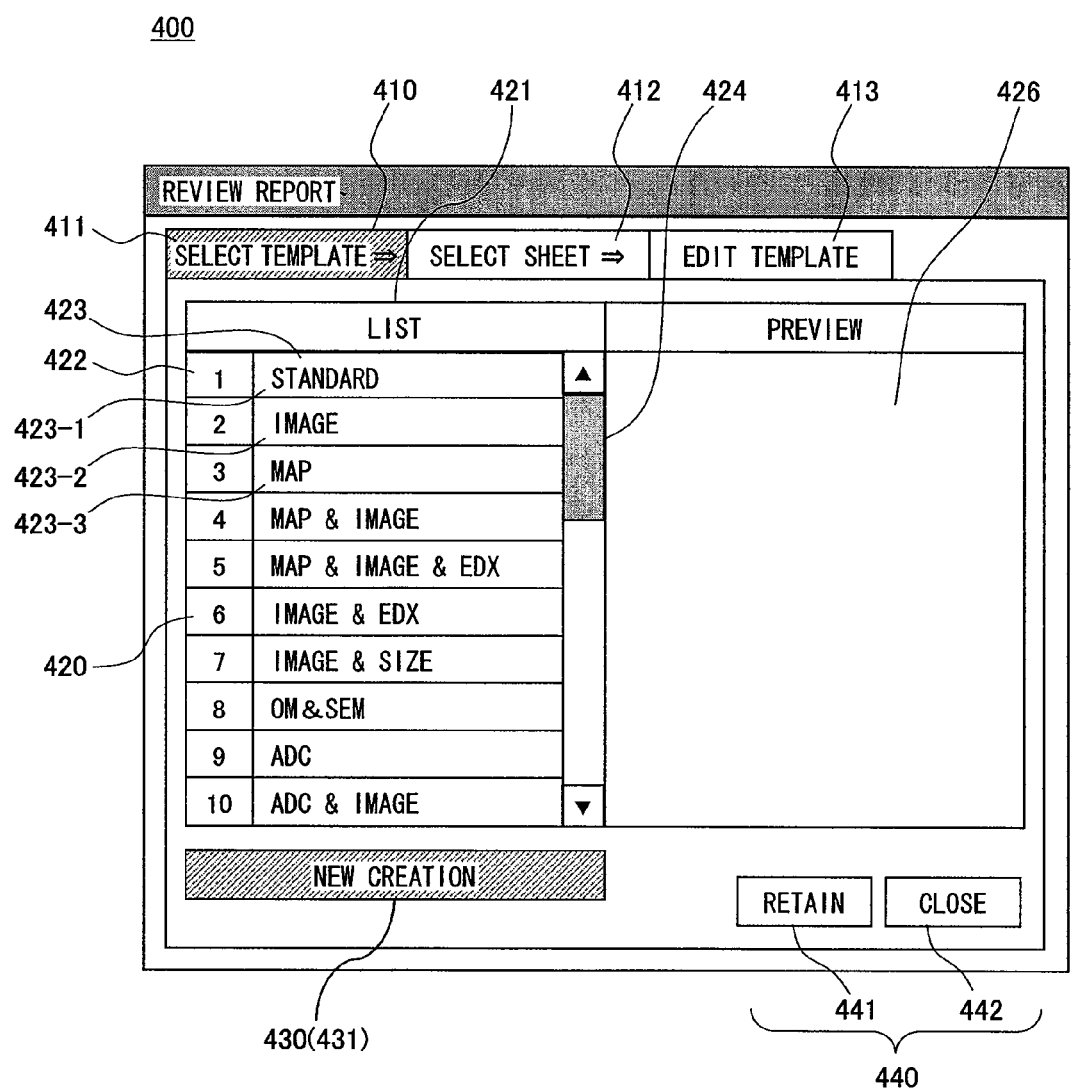
FIG. 4 is a diagram illustrating a template selection screen for the template for setting up an output format.

FIG. 4 is a diagram illustrating the template selection screen for the template for setting up an output format.

The template selection screen 400 for the template for setting up an output format according to the present embodiment has a configuration which includes a tab switch 410, an existing template selector 420, a new creation selector 430 and a setup section 440.

The tab switch 410 make it possible to change displays through a tab for a template selection screen 411, a tab for a sheet selection screen (medium selection screen) 412 and a tab for a template edition screen 413. In the case of the present embodiment, once a setup is made for creating or editing a template for setting up an output format, the template creation manager 30 is designed to select and display the template selection screen 400 as a default. In addition, the tab switch 410 is designed to highlight a selected one of the tabs 411 to 413 against the other tabs.

In the case of this template selection screen 400, the existing template selector 420 has a configuration which includes an existing template list guide area 421 and a preview area 426.

A number displaying column 422 and a recipe contents column 423 are formed in the existing template list guide area 421. The number displaying column 422 is that for identifying and selecting one of existing templates. The recipe contents column 423 is that for displaying a recipe content of an existing template to be selected by a selection made on the number column for the identification and selection. Examples of the recipe contents include: "standard" 423-1 indicating a standard review report; "image" 423-2 indicating a review report with a defect image; "map" 423-3 indicating a review report with a map representing a location of defects, such as a wafer map; and "map & image" 423-4 indicating a review report with the map and the defect image. It should be noted that the templates guided and displayed in this existing template list guide area 421 are not limited to ready-made templates which the maker has made beforehand, but include templates which a user has so far made newly.

When the template selection screen 400 is intended to be displayed, the template creation manager 30 extracts a template property file from the template information file of the existing templates each for setting up an output format, and thus generates data on a list of the exiting templates. The template property file includes the numbers for identifying and selecting the respective existing templates and the recipe contents of the respective existing templates. The template information file is stored in the template retention file, provided to the storage 27, for storing and accumulating the existing templates each for setting up an output format.

In addition, the existing template list guide area 421 is provided with a scroll bar 424. By use of the scroll bar 424, existing templates to be each displayed in the form of a list in the existing template list guide area 421 are configured to be capable of being changed and displayed on the screen.

Through this template selection screen 400, the user can carry out a selecting operation for choosing whether to create a new template or whether to edit an existing template (in step S301 in FIG. 3).

In a case where, for example, the user intends to create a new template, the user operates the mouse 28 to place the pointer on a "new creation" icon 431 in the new creation selector 430, and clicks on the icon. Thereby, the OSD function of the display 25 causes the operation for the "new creation" to be recognized through the GUI function of the overall controller 23. Thus, a sheet selection screen 600, which will be described later, is displayed on the display 25 by OSD, and the template creation manager 30 is accordingly put in a GUI environment in which the sheet selection screen 600 is used, in the case of the present embodiment (in step S302 in FIG. 3).

On the other hand, in a case where the user intends to edit an existing template, the user operates the mouse 28 to place the pointer, for example, on a number representing a desired template in the number displaying column 422, or on a desired recipe content representing the desired template in the recipe contents column 423, in the existing template list guide area 421, and clicks on the number or the recipe content. Thereby, the template creation manager 30 displays a preview of the selected existing template in the preview area 426 (in step S303 in FIG. 3).

When the template creation manager 30 is going to display the preview of the selected existing template in the preview area 426, the template creating manager 30 reads a template information file of the selected existing template from the template retention file in the storage 27 to a work area of its own.

Figure 5:
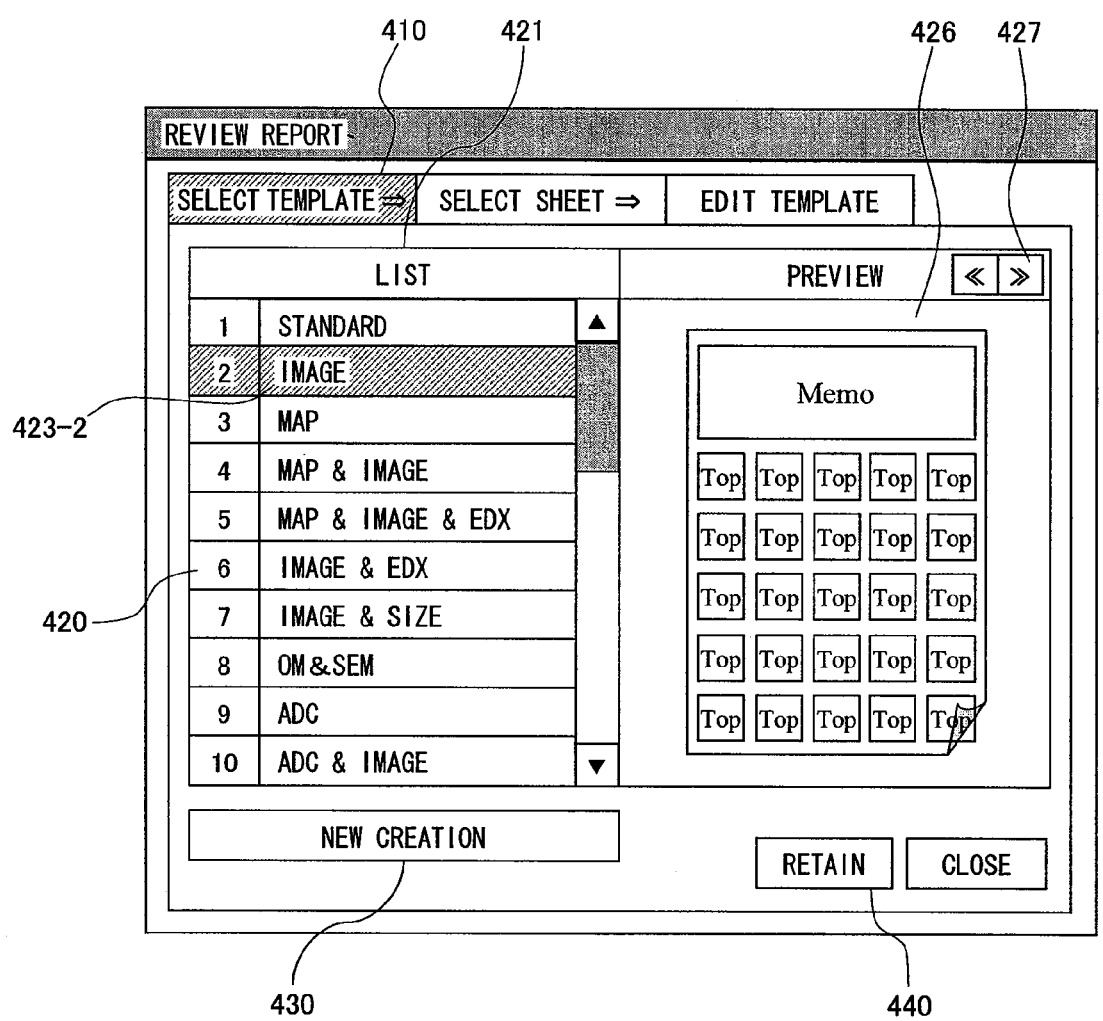
FIG. 5 is a diagram of a configuration of an example of the template selection screen as shown in FIG. 4, with which a preview of an existing template is being displayed on the template selection screen.

FIG. 5 is a diagram showing the template selection screen as shown in FIG. 4, on which the preview of the selected existing template is being displayed.

FIG. 5 shows an example of the screen on which the preview is being displayed in a case where the user has selected and operated a template for outputting an image 423-2 in the existing template list guide area 421. In the illustrated case, it can be learned from the preview of the template for outputting an image 423-2, which is displayed in the preview area 426, that the template for outputting an image 423-2 is a template as follows. In the template, a memo information field is displayed in a size corresponding to "Memo" in a header of a vertical sheet, and a plurality of Top images are arranged each in a size corresponding to "Top" in a part of the sheet under the header.

In addition, in a case where the template creation manager 30 recognizes that the selected existing template is multiple-pages in length, the template creation manager 30 is configured to display icons for page down and page up 427 in the preview area 426 by OSD.

Depending on a result of his/her check on the selected existing template, the user operates, for example, the tab for a template selection screen 411, the tab for a sheet selection screen 412 or the tab for a template edition screen 413 in the tab switch 410. Otherwise, the user operates a "retention" icon 441 or a "close" icon 442 in the setup section 440.

While performing the template selection process of selecting the template for setting up an output format through the template selection screen 400 in the foregoing manner, if the "new creation" icon 431 in the new creation selector 430 or the tab for a sheet selection screen 412 in the tab switch 410 is operated, the template creation manager 30 causes the sheet selection screen 600, instead of the template selection screen 400, to be displayed on the display 25 by OSD by use of the GUI function of the overall controller 23, and performs the sheet selection process (in step S304 in FIG. 3).

Figure 6:
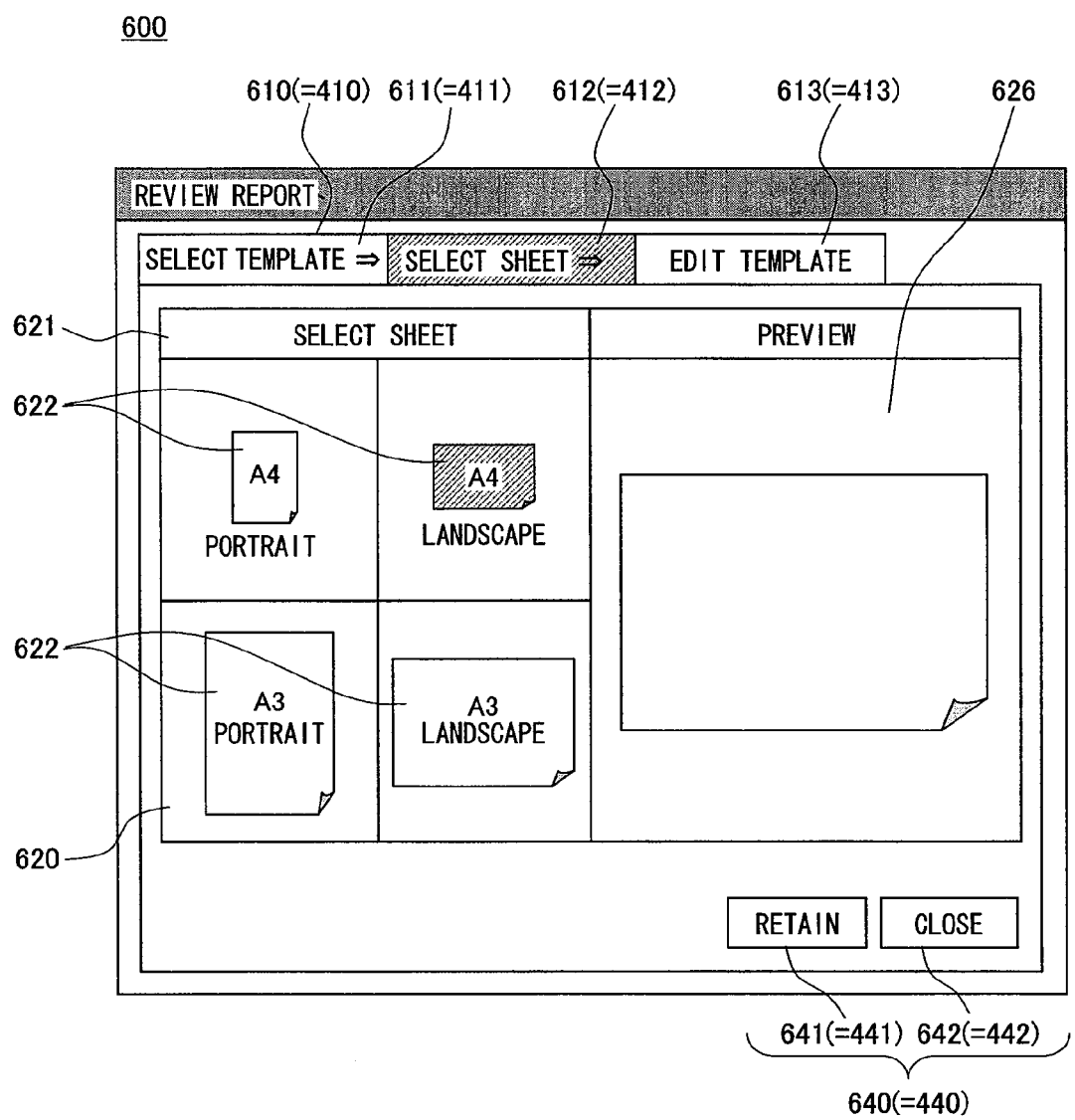
FIG. 6 is a diagram illustrating a sheet selection screen.

FIG. 6 is a diagram illustrating the sheet selection screen. The sheet selection screen 600 according to the present embodiment has a configuration which includes a tab switch 610, a sheet selector 620 and a setup section 640.

The tab switch 610 and the setup section 640 have the same icon configuration as the tab switch 410 and the setup section 440 in the template selection screen 400 have, respectively.

In the sheet selection screen 600, the sheet selector 620 has a configuration which includes a sheet type guide area 621 and a preview area 626. In the sheet selector 620, sets each consisting of a selectable sheet size and a selectable sheet orientation (portrait or landscape) are displayed in the form of a list by use of sheet icons 622.

The user selects a desired sheet type from the sheet type guide area 621 in the sheet selector 620, and operates the mouse 28 to place the pointer and click on the corresponding sheet icon 622. Thereby, the user can select the desired sheet.

In the preview area 626, a schematic view of the selected sheet is displayed as a preview.

It should be noted that the sheet selection screen 600 as shown in FIG. 6 is a sheet selection screen 600 which is used for a process of creating a new template in a case where the "new creation" icon 431 in the new creation selector 430 is operated while performing a template selection process through the template selection screen 400 for the template for setting an output format.

Depending on a result of his/her check on the selected sheet, the user operates, for example, a tab for a template selection screen 611, a tab for a sheet selection screen 612 or a tab for a template edition screen 613 in the tab switch 610. Otherwise, the user operates a "retention" icon 641 or a "close" icon 642 in the setup section 640.

In this case, if the selected sheet is adequate for his/her purpose, the user operates, for example, the tab for a template editing screen 413 in the tab switch 410, and thus carries out work for editing the template.

By this, if the template creation manager 30 recognizes that the tab for a sheet selection screen 412 is operated, the template creation manager 30 stores information on the selected sheet, as a sheet information file, in a work area of its own. In addition, the template creation manager 30 causes a template edition screen 800, instead of the sheet selection screen 400, to be displayed on the display 25 by OSD through the GUI function, and thus performs the work for editing the template (in step S305 in FIG. 3).

Figure 7:
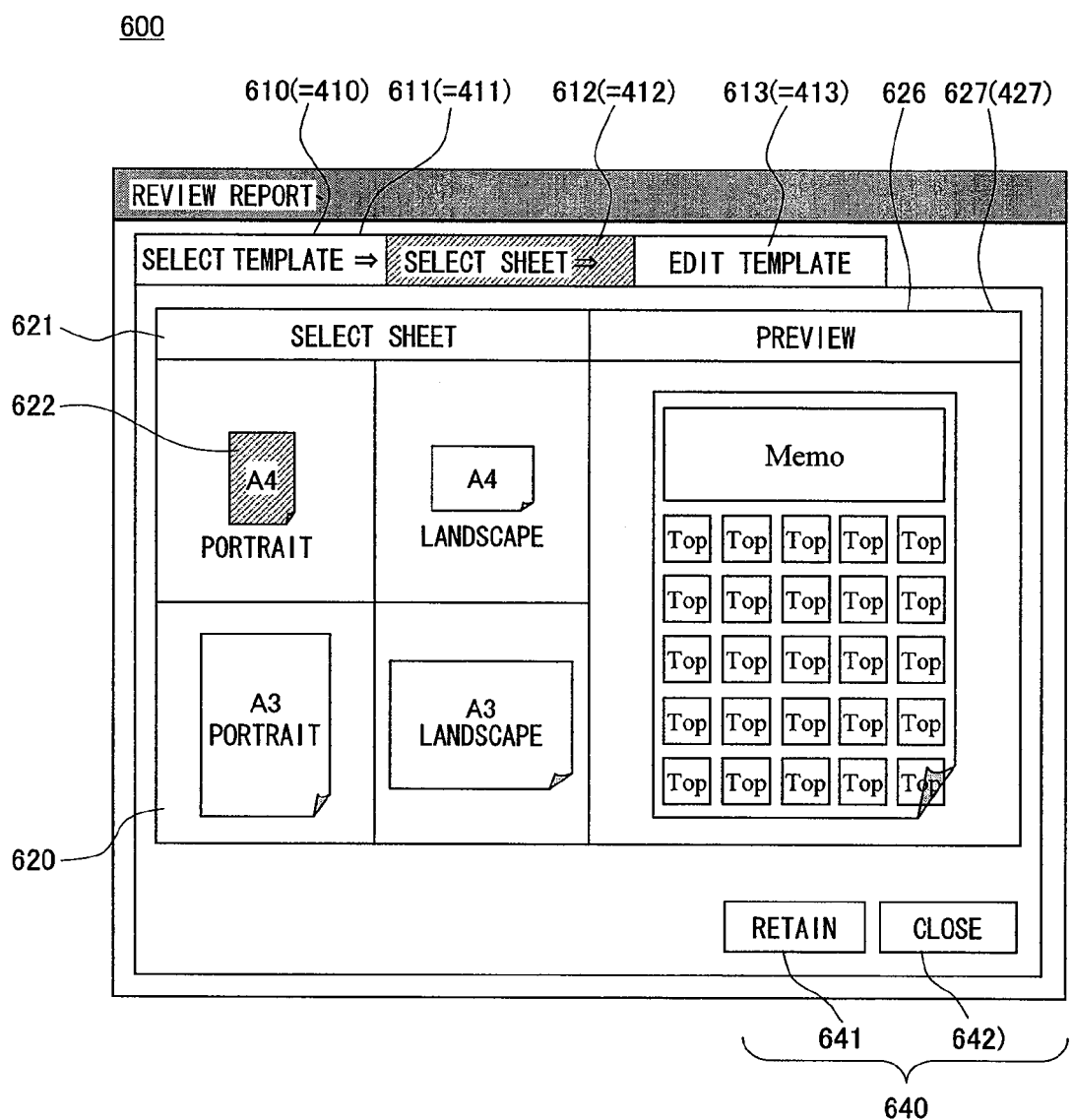
FIG. 7 is a diagram showing how the sheet selection screen is displayed in a case where the existing template is selected through the template selection screen as shown in FIG. 5.

FIG. 7 is a diagram showing how the sheet selection screen is displayed in a case where the existing template is selected through the template selection screen as shown in FIG. 5.

The diagram shown in FIG. 7 corresponds to cases where the tab for a sheet selection screen 612 is operated after the existing template is selected while performing a template selection process through the template selection screen 400.

In this case, a sheet icon 622 representing a sheet type stored as information corresponding to the existing template is highlighted and displayed in the sheet type guide area 621 in the sheet selector 620. In addition, a preview of the selected existing template is displayed in the preview area 626

If the tab for a template edition screen 413 in the tab switch 410 is operated while performing the template selection process through the template selection screen 400, or if the tab for a template edition screen 613 in the tab switch 610 is operated while performing the sheet selection process through the sheet selection screen 600, the template creation manager 30 stores information on the selected sheet, as a sheet information file, in the work area of its own. In addition, the template creation manager 30 causes a template edition screen 800 as shown in FIG. 8, which will be described later, to be displayed on the display 25 by OSD through the GUI function of the overall controller 23, and thus performs the template edition process.

Figure 12:
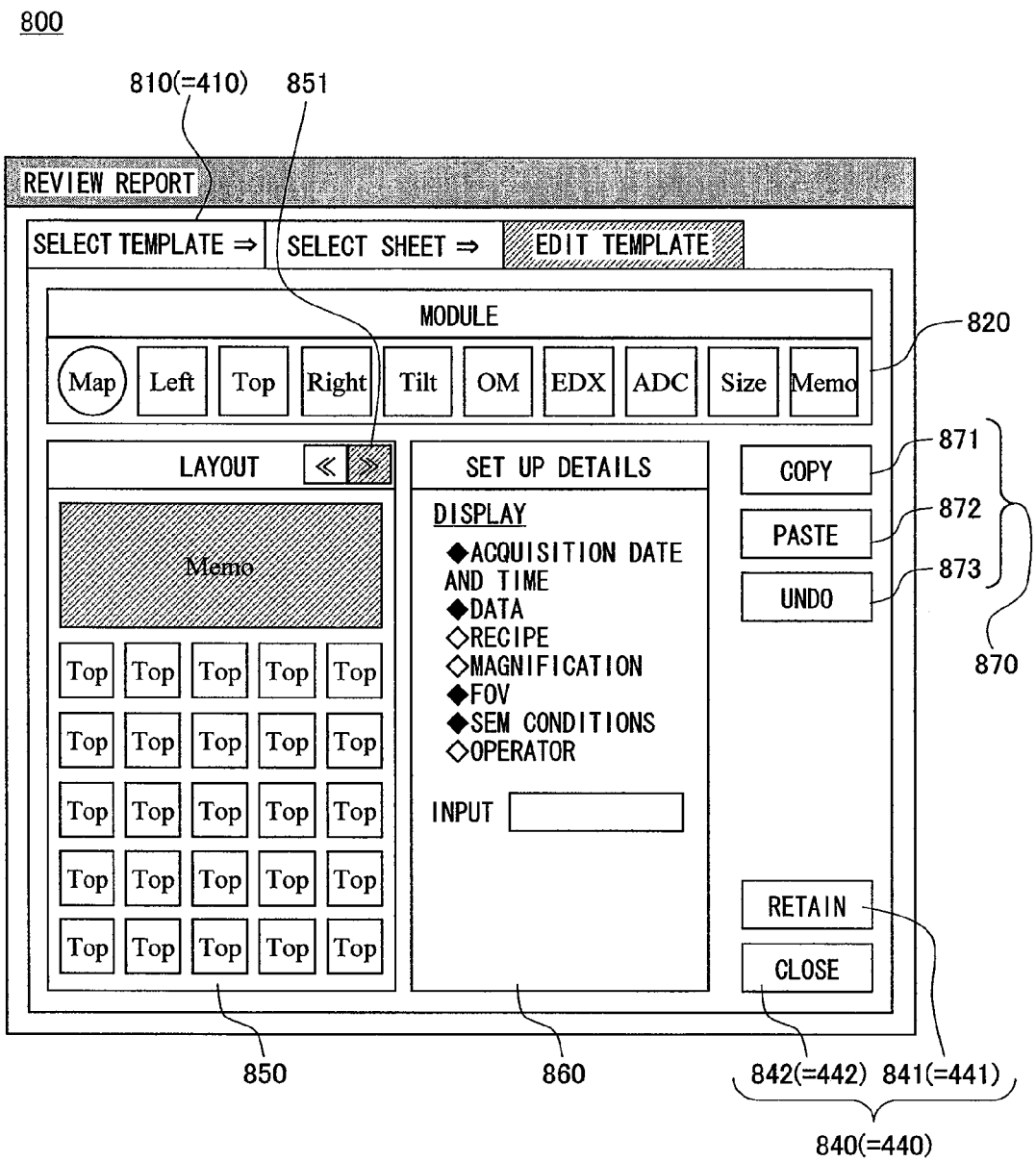
FIG. 12 is a diagram illustrating a template edition screen for editing a template which appears in a case where a portrait sheet has been selected while performing a sheet selection process.

When the template creation manager 30 causes the template edition screen 800 to be displayed on the screen 25 by OSD, the template creation manager 30 controls the display of the sheet which has been selected while performing the sheet selection process through the sheet selection screen 600 so that an output format setup area 850 of the template edition screen 800, which will be described later, can be displayed in a fully large size in accordance with the sheet selected while performing the sheet selection process through the sheet selection screen 600 (in step S304 in FIG. 3). In a case where, for example, a portrait sheet is selected, the template edition screen 800 is switched and displayed in an optimal size with an optimal layout as shown in FIG. 12, which will be described later. In a case where, for example, a landscape sheet is selected, the template edition screen 800 is switched and displayed in an optimal size with an optimal layout as shown in FIG. 8.

Figure 8:
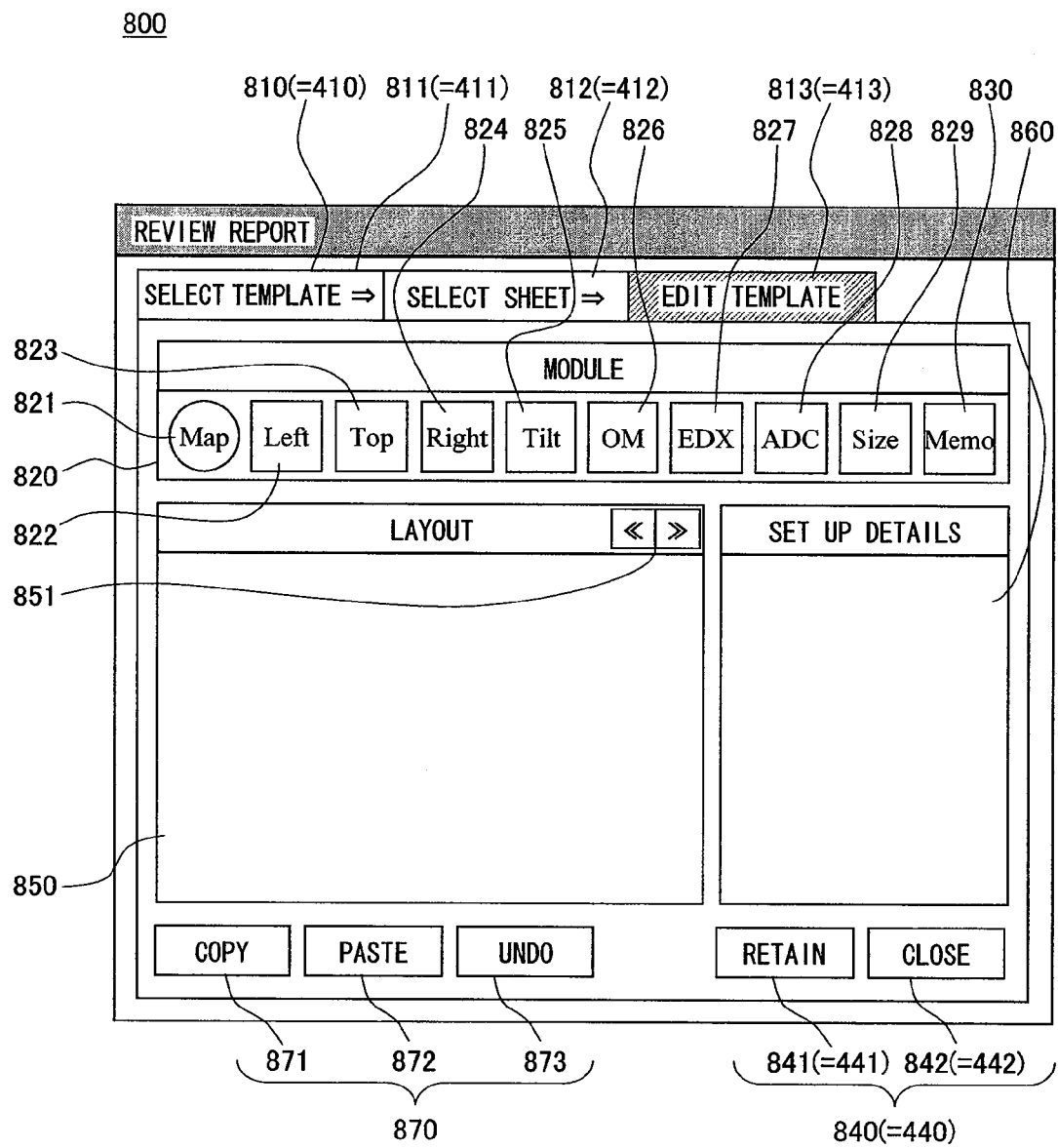
FIG. 8 is a diagram illustrating a template edition screen used for editing a template.

FIG. 8 is a diagram illustrating the template edition screen used for editing a template.

It should be noted that the template edition screen 800 shown in FIG. 8 is a screen obtained by controlling the display, as described above with regard to step S304, after a landscape sheet is selected while performing the above-described sheet selection process through the sheet selection screen 600 as shown in FIG. 6.

As shown in FIG. 8, the template edition screen 800 according to the present embodiment has a configuration which includes a tab switch 810, a module selector 820, an output format setup area (format image area) 850, a detail setup area 860, an edition operator 870 and a setup section 840.

It should be noted that the tab switch 810 and the setup section 840 have the same icon configuration as the tab switch 410 and the setup section 440 in the template selection screen 400 have, respectively.

Report components (modules) are displayed in the form of icons in the module selector 820. In the case of the present embodiment, the module selector 820 is provided with: a "MAP" icon 821 for specifying inclusion of a wafer map; a "Left" icon 822 for specifying inclusion of a Left image; a "Top" icon 823 for specifying inclusion of a Top image; a "Right" icon 824 for specifying inclusion of a Right image; a "Tilt" icon 825 for specifying inclusion of a Tilt image; an "OM" icon 826 for specifying inclusion of an OM image; an "EDX" icon 827 for specifying inclusion of an EDX result; an "ADC" icon 828 for specifying inclusion of an ADC result; a "Size" icon 829 for specifying inclusion of a size distribution; and a "Memo" icon 830 for specifying inclusion of memo information.

A page space of a sheet for the review report is displayed in the output format setup area (format image area) 850. The output format setup area 850 is that for editing a layout for including the foregoing modules. Moreover, for the purpose of providing for a case where there are a plurality of existing templates, the output format setup area 850 is provided with icons for page down and page up 851 in order to edit, and check on, the plurality of existing templates.

The detail setup area 860 is an area for setting up details of contents and the like which are going to be included in the review report.

The edition operator 870 is tool buttons used for editing the individual modules 821 to 830, which are provided to the module selector 820, in the output format setup area 850. The edition operator 870 according to the present embodiment is provided with a "copy" icon 871, a "paste" icon 872 and an "undo" icon 873.

FIG. 8 represents an initial condition of the template edition screen 800 which is used when a new template is going to be created. Because the modules 821 to 830 have not been registered for outputting a report yet, nothing is displayed in the output format setup area 850 or the detail setup area 860.

Descriptions will be provided for a specific edition process to be performed through the template edition screen 800 according to the present embodiment on the basis of FIGS. 9 to 14.

Figure 9:
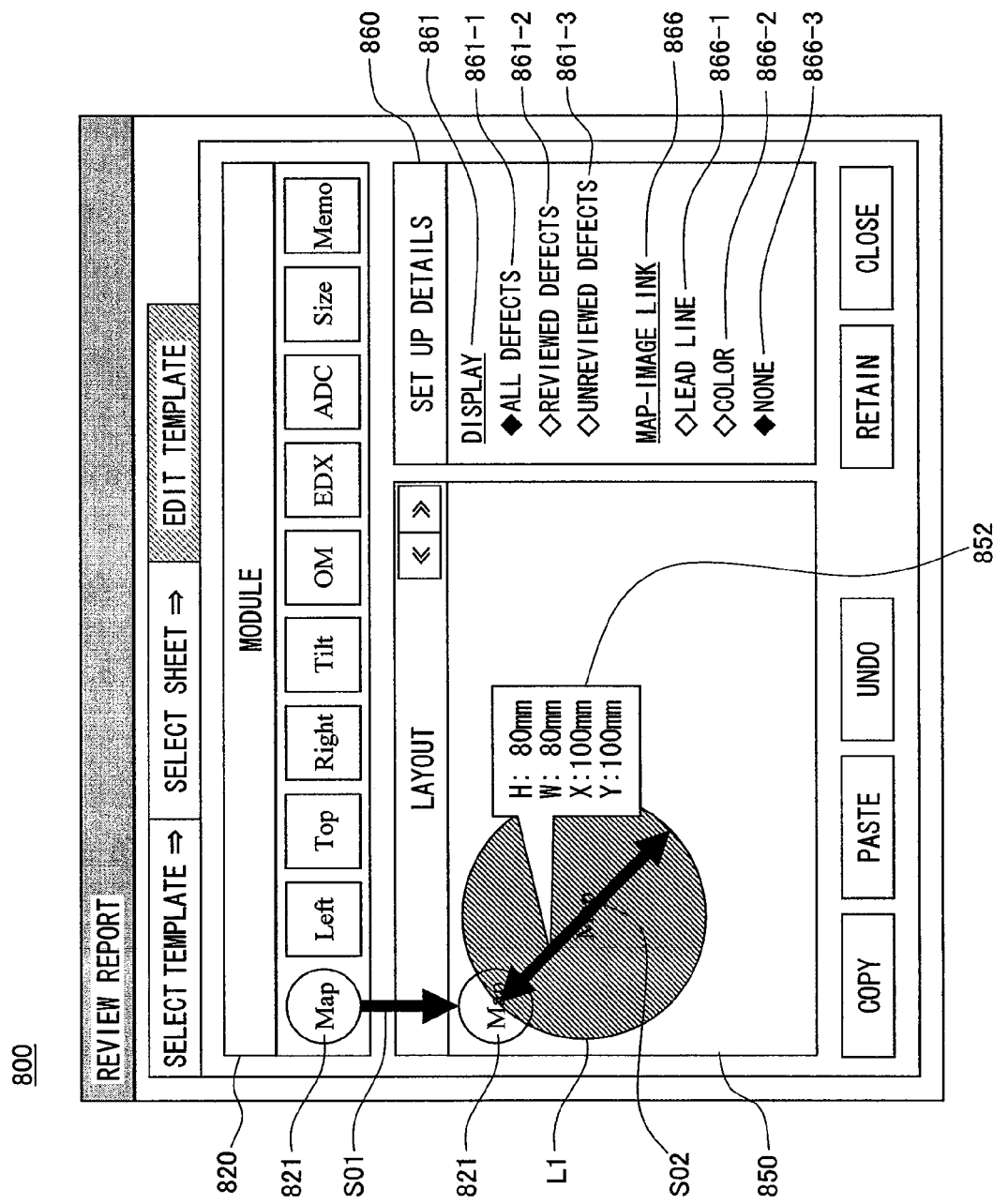
FIG. 9 is a diagram illustrating an example of a specific operation for editing a template through the template edition screen.

FIG. 9 is a diagram showing an example of a specific operation for editing a template through the template edition screen.

In this point, descriptions will be provided for an edition process in which the template creation manager 30 registers a wafer map on a report format, citing a case where the user is going to register the wafer map as a desired module.

First of all, the user selects the "Map" icon 821 for showing a wafer map through the module selector 820 by use of the pointing device such as the mouse 28 (in step S305 in FIG. 3). Thus, the user places the selected "Map" icon 821 in a desired position in the output format setup area 850 by a drag-and-drop operation S01 (in step S306 in FIG. 3).

Subsequently, the user selects the "Map" icon 821 arranged in the output format setup area 850 for the purpose of performing a detail setup by use of the pointing device such as the mouse 28. Thus, the user sets the selected "Map" icon 821 in a desired size L1 through a size change operation S02. At this time, information 852 on the size and the position of the "Map" icon 821 in the coordinates system in the sheet is displayed as support information for the size setup (in step S307 in FIG. 3).

Furthermore, the user sets up detailed information on the selected module in the detail setup area 860.

In this case, because the "Map" icon 821 for showing the wafer map has been selected, the template creation manager 30 causes information on a detailed setup corresponding to the wafer map to be displayed in the detail setup area 860.

Defects to be displayed in the wafer map are set up in a display setup field 861. In the illustrated case, selectable are a mode for displaying all the defects registered in inspection information 861-1, a mode for displaying the reviewed defects only 861-2, and a mode for displaying the defects which have not been reviewed yet only 861-3.

A method of displaying defects represented on the wafer map and the respective SEM images in a corresponding manner on the review report is set up through a Map-image link set up 866. Selectable are a lead line mode for using lead lines 866-1, a color mode for using a color identification display 866-2, and a naught mode for not displaying the defects represented on the wafer map and the respective SEM images in a corresponding manner on the review report 866-3. Detailed descriptions will be provided later for the lead line mode 866-1 and the color mode 866-2 out of the three modes.

When the user is going to select and set up one of these modes, the user uses checkboxes displayed for the respective modes in the corresponding manner, and thus sets up detailed information on the selected module (in step S308 in FIG. 3).

In response to these operations, the template creation manager 30 obtains various types of format information, including the position of the "Map" icon 821 in the coordinates system in the original report format, on the basis of a position which the "Map" icon 821 to be displayed on the output format setup area 850 by OSD is arranged by use of the GUI of the overall controller 23 or on the basis of equivalents. Thus, the template creation manager 30 stores the obtained various types of format information, as a module information file, in the work area of its own.

Figure 10:
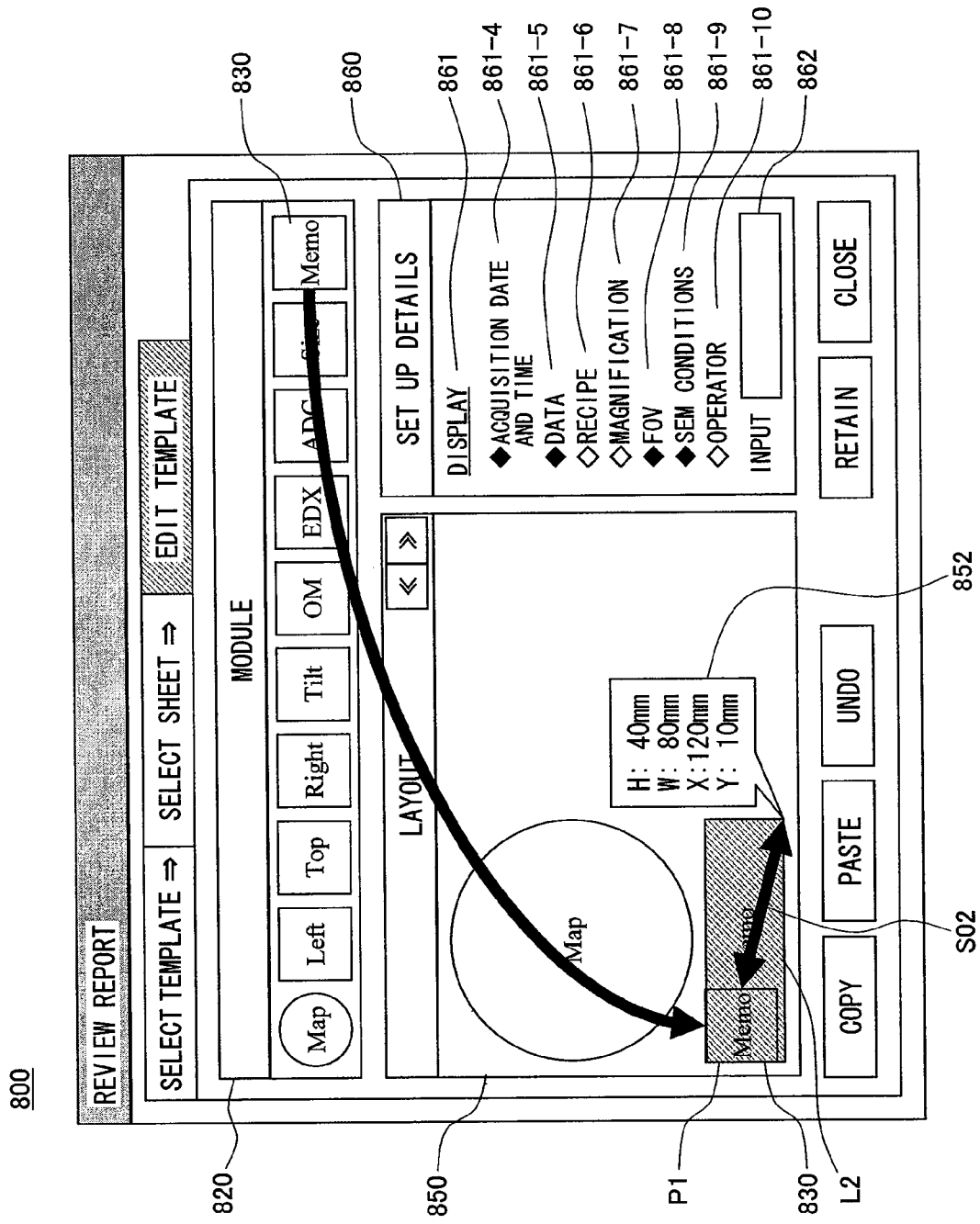
FIG. 10 is a diagram illustrating another example of a specific process for editing a template through another template edition screen.

FIG. 10 is a diagram illustrating another example of a specific process for editing a template through the template edition screen.

In this respect, descriptions will be provided, with an example, for an edition process in which the template creation manager 30 registers memo information in the report format.

In this respect, the user selects the "Memo" icon 830 for specifying inclusion of memo information through the module selector 820 by use of the pointing device such as the mouse 28 (in step S305 in FIG. 3). Thus, the user places the selected "Memo" icon in a desired position P1 in the output format setup area 850 through another drag-and-drop operation S01 (in step S306 in FIG. 3).

Subsequently, the user selects the "Memo" icon 830 arranged in the output format setup area 850 for the purpose of performing a detail setup by use of the pointing device such as the mouse 28. Thus, the user sets the selected "Memo" icon 830 in a desired size L2 through a size change operation S02. At this time, information 852 on the size and the position of the "Memo" icon 830 in the coordinates system in the sheet is displayed as support information for the size setup (in step S307 in FIG. 3).

Furthermore, the user sets up detailed information on the selected module in the detail setup area 860.

In this case, because the "Memo" icon 830 for showing the memo information has been selected, the template creation manager 30 causes information on detailed setup corresponding to the memo information to be displayed in the detail setup area 860.

Contents to be included as memo information in the review report are set up in the display setup field 861 of this case. In the illustrated case, for example, for the purpose of providing for the issuing of the review report by use of the output format setup template which is created or edited this time through the report outputting function 40, the display setup field 861 is provided with checkboxes respectively for: the date and time when data on inspection of an review object has been obtained 861-4; the data name 861-5; the name of a recipe which has been used for the inspection 861-6; a magnification for image pickup 861-7; an FOV (Field of View) size 861-8; SEM setup conditions 861-9; and an operator name 861-10. In addition, the display setup field 861 is provided with an input area 862. For this reason, by inputting a desired character string by use of an inputting device such as the keyboard 26, the arbitrary character string is capable of being displayed on the review report.

In response to these operations, the template creation manager 30 obtains various types of format information, including the position of the "Memo" icon 830 in the coordinates system originally in the report format, on the basis of a position in which the "Memo" icon 830 to be displayed in the output format setup area 850 by OSD is arranged by use of the GUI of the overall controller 23 or on the basis of equivalents. Thus, the template creation manager 30 stores the obtained various types of format information, as a module information file, in the work area of its own.

The edition process for registering individual modules on the report format is carried out by arranging desired ones of the individual modules 821 to 830 from the module selector 820 to the respective desired positions in the output format setup area 850 in a repeated manner as described above (in step S309 in FIG. 3).

Figure 11:
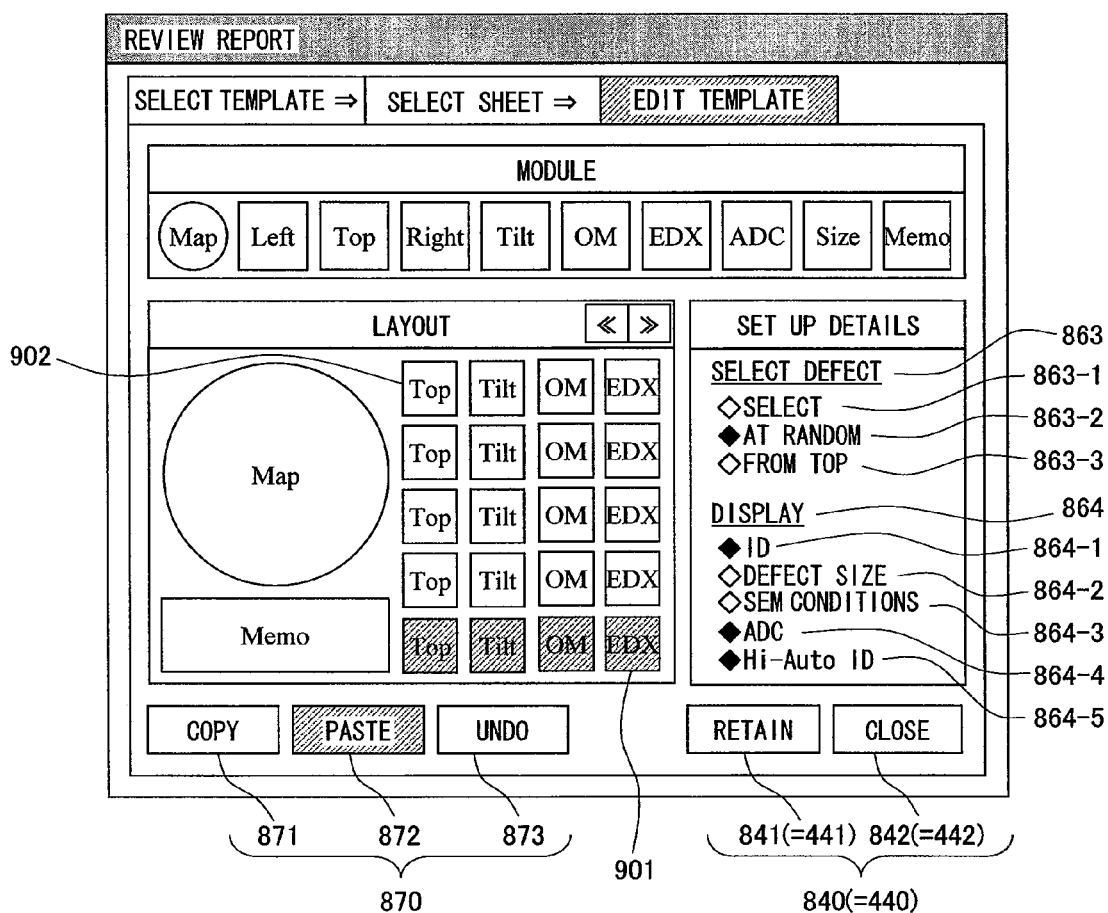
FIG. 11 is a diagram illustrating yet another example of a specific operation for editing a template through yet another template edition screen.

FIG. 11 is a diagram showing yet another example of a specific operation for editing a template through the template edition screen.

In the case shown in FIG. 11, the Top image, the Tilt image, the OM image and the EDX result which are going to be registered repeatedly are selected as a set 901. By using the "copy" icon 871 and the "paste" icon in the edition operator 870 repeatedly, 5 sets 902 each consisting of the Top image, the Tilt image, the OM image and the EDX result are registered in total (as corresponding to steps S305 to S309 in FIG. 3).

In this case, too, the user sets up detailed information on the selected module through the detail setup area 860.

Because the modules which are represented by the "Top" icon 823, the "Tilt" icon 825, the "OM" icon 826 and the "EDX" icon 827 have been selected in this case, the template creation manager 30 displays information on detailed setup, which corresponds to each of the results of these inspections, in the detail setup area 860.

In the illustrated case, a method of selecting defects to be included in a review report in a case where the review report is going to be issued by use of the output format setup template which is created or edited this time through the report outputting function 40 is set up through a defect selection field 863. Modes which are capable of being set up for defects to be included in the report includes: a selection mode 863-1 in which a desired defect can be selected as the defect to be included when the report is going to be outputted; a random mode 863-2 in which a defect to be included in the report can be automatically selected in a random manner; and a sequence-from-top mode 863-3 in which a defect can be automatically selected in a sequence from a smaller defect number to a larger defect number.

In addition, modes which are capable of being set up in a display field 864 in response to SEM images, EDX results and the like to be included in the respective review reports include: an ID mode 864-1 for displaying a defect ID; a defect size mode 864-2 for displaying a defect size; an SEM condition mode 864-3 for displaying SEM conditions such as a magnification and an electric current value or a voltage value; an ADC mode 864-4 for displaying a result of classification according to ADC; and a "Hi-Auto ID" mode 864-5 for displaying a result of analysis of composition based on the EDX result. When the user selects and sets up any one of these modes, the user uses checkboxes displayed for the respective modes in the corresponding manner, and thus sets up detailed information on the selected module (in step S308 in FIG. 3).

In response to these operations, the template creation manager 30 obtains various types of format information, including the position of the "Top" icon 823 in the coordinates system in the original report format, on the basis of positions in which the "Top" icon 823 to be displayed on the output format setup area 850 by OSD and the like are respectively arranged by use of the GUI of the overall controller 23 and on the basis of equivalents. Thus, the template creation manager 30 stores the obtained various types of format information, as a module information file, in the work area of its own.

It should be noted that, in a case where, for example, there are a plurality of existing templates in the output format setup area 850, the user can edit and check on contents in the following pages or the preceding pages by operating the icons 851 for page down and page up.

FIG. 12 is a diagram illustrating a template edition screen for editing a template in a case where a portrait sheet has been selected while performing the sheet selection process.

The template edition screen as shown in FIG. 12 is a template edition screen 800 for a portrait sheet which the template creation manager 30 causes to be displayed in the display by OSD 25 through the GUI function of the overall controller 23 in a case where, for example, the tab for a template edition screen 613 in the tab switch 610 is operated in the sheet selection screen 600 as shown in FIG. 7.

The template edition screen 800 for a portrait sheet as shown in FIG. 12 is different from the template edition screens 800 each for a landscape sheet as shown in FIGS. 8 to 11 in layouts respectively for the output format setup area (format screen area) 850, the detail setup area 860, the edition operator 870 and the setup section 840 on the screen. This makes it possible to display the output format setup area 850 in the template edition screen 800 in a larger size in the longitudinal direction of the portrait sheet correspondingly.

Figure 13:
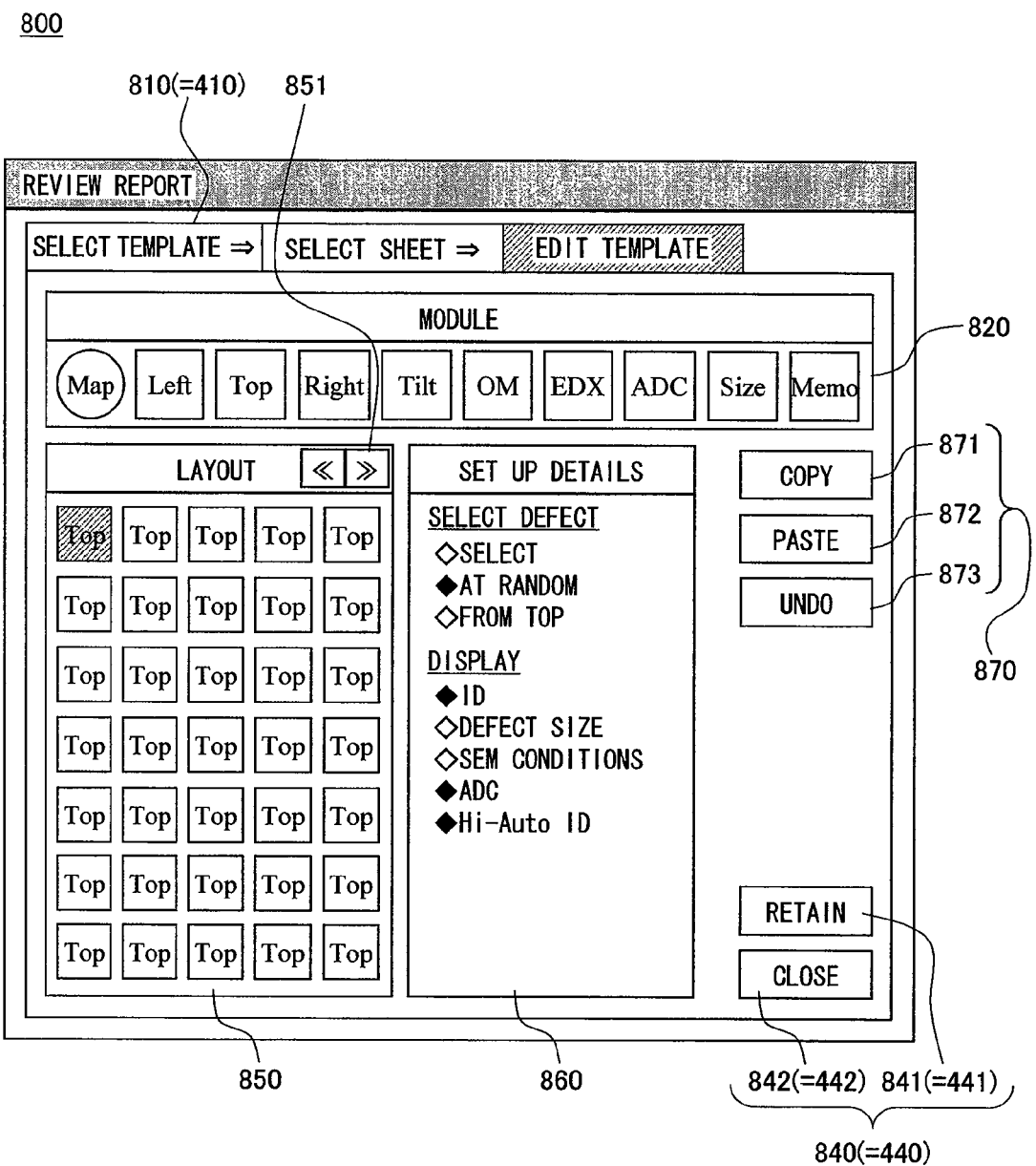
FIG. 13 is a diagram illustrating a template edition screen which comes in any place after a first template edition screen in a case where there are a plurality of templates needed to be edited.

FIG. 13 is a diagram illustrating a template edition screen which comes in any place after a first template edition screen in a case where there are a plurality of templates needed to be edited.

The template edition screen 800 as shown in FIG. 13 is, for example, a second template edition screen 800 displayed in the following condition in a case where there are a plurality of template edition screens 800 each for the portrait sheet as shown in FIG. 12 which correspond respectively to a plurality of review reports, and in a case where there are a plurality of templates corresponding respectively to the plurality of review reports. First of all, a first template corresponding to a first review report is displayed in the output format setup area (format screen area) 850. Subsequently, the icons 851 for page down and page up are operated for the page down purpose. As a result, the second template edition screen 800 is displayed. In this case, the following thing can be learned by seeing the difference in contents in the template displayed in the output format setup area (format screen area) 850 between the template edition screen 800 as shown in FIG. 12 and the template edition screen 800 as shown in FIG. 13. Even in a case where there are a plurality of templates, the present embodiment makes it possible to edit the templates individually through the respective template edition screens 800.

Once a "retention" icon 841 in the setup section 840 is operated in each of the template edition screens 800 as shown in FIGS. 8 to 13, the template creation manger 30 causes an input area 880 to be popped up and displayed through the GUI function of the overall controller 23 when a template which has been created or edited on the template edition screen 800 is going to be retained, as an existing output format setup template, in the template retention file in the storage 27. The input area 880 is that for inputting an arbitrary character string for causing recipe contents to be displayed in the recipe content column 423 in the template list guide area 421 in the template selection screen 400 as shown in FIG. 4.

Subsequently, when the user inputs a desired character string with which a recipe content is identified by use of the input device such as the keyboard 26, the template creation manager 30 generates a template property file, which includes this character string, in the work area of its own. Thus, the template creation manager 30 generates a template information file obtained by putting together the template property file, sheet information file, module information file which are all concerned with the output format setup template which is created or edited this time. Thereafter, the template creation manager 30 causes the template information file to be stored and accumulated in the template retention file in storage 27, and hence retains and manages the template information file (in step S310 in FIG. 3).

Figure 14:
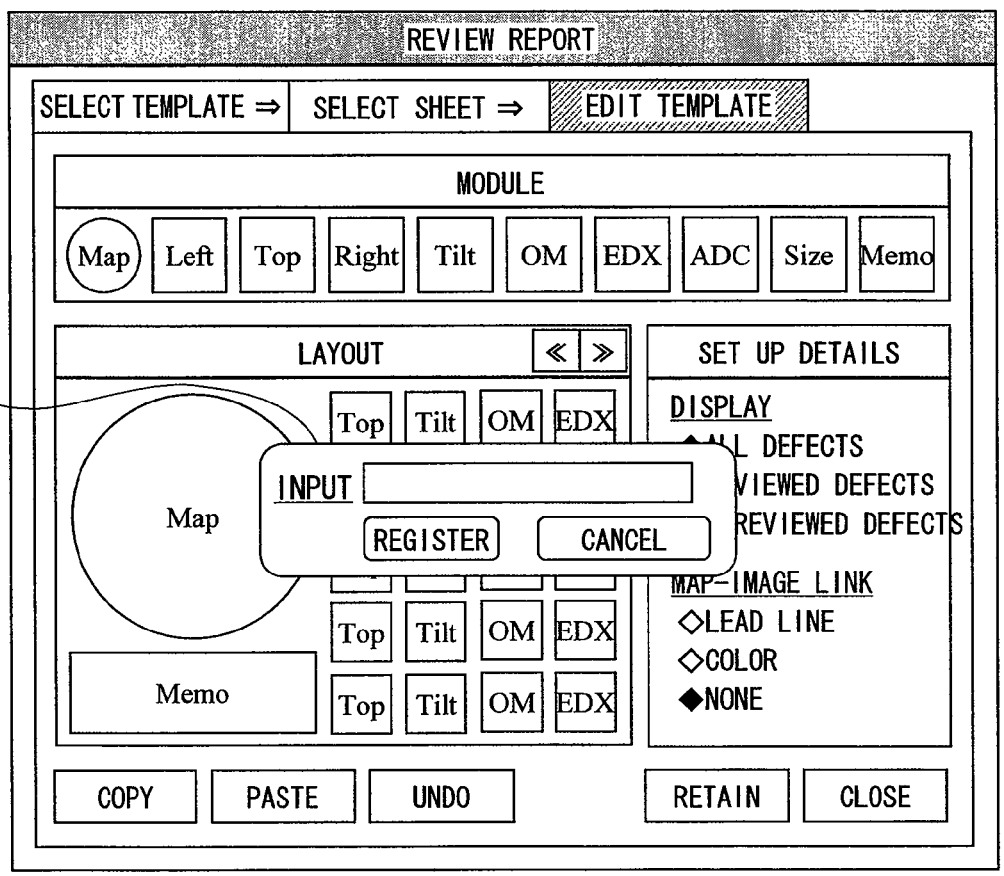
FIG. 14 is a diagram illustrating a template edition screen used for registering an output format setup template whose creation or edition is completed this time.

FIG. 14 shows a template edition screen in which the input area 880 is popped up and displayed.

Descriptions will be provided next for relationships among the template creation manager 30 described with regard to the present embodiment, the template property file, the sheet information file, the module information file, the template information file obtained by putting together these files, and the template retention file, on the basis of the related drawings.

Figure 15:
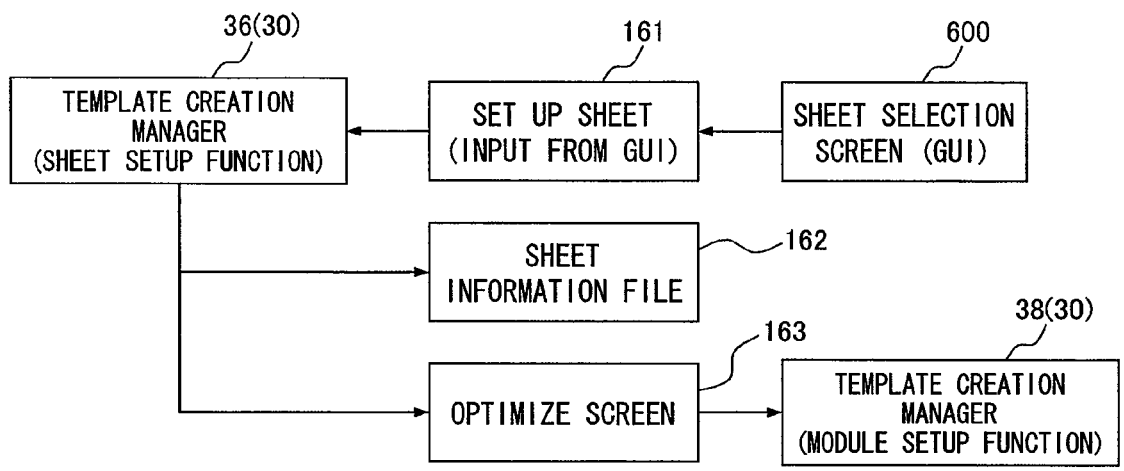
FIGS. 15A and 15B are diagrams each illustrating a relationship between a sheet setup function included in a template creation manager and a sheet information file.
Figure 15:
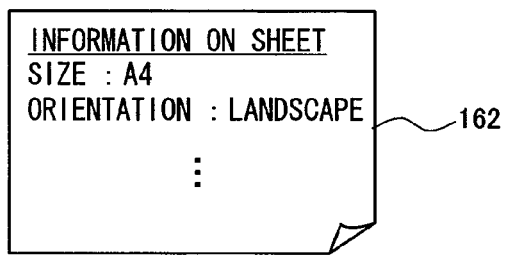

FIGS. 15A and 15B show a relationship between a sheet setup function included in the template creation manager and the sheet information file.

As shown in FIG. 15A, a sheet setup function 36 in the template creation manager 30 generates a sheet information file 162 for a sheet setup 161 inputted through the sheet selection screen 600 by use of the GUI function of the overall controller 23. In addition, the sheet setup function 36 supplies an image display optimization 163 to a module setup function 38 in the template creation manager 30 for the purpose of optimizing a template display in the output format setup area 850 in the template edition screen 800. FIG. 15B shows a configuration of the sheet information file 162.

Figure 16:
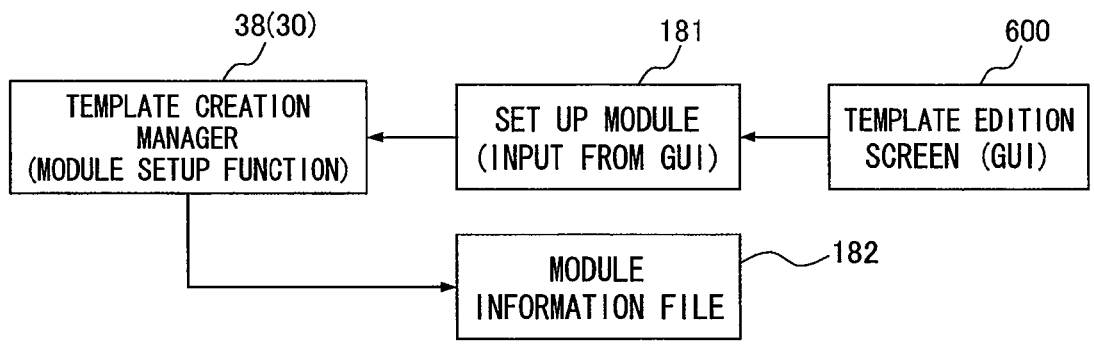
FIGS. 16A and 16B are diagrams each illustrating a relationship between a module setup function included in the template creation manager and the module information file.
Figure 16:
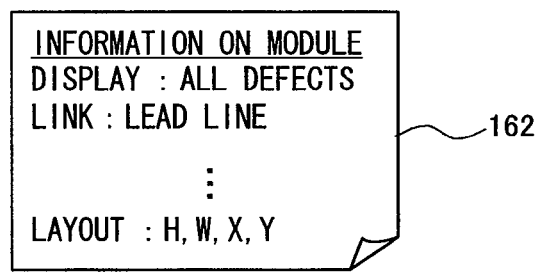

FIGS. 16A and 16B show a relationship between the module setup function included in the template creation manager and the module information file.

As shown in FIG. 16A, a module setup function 38 in the template creation manager 30 generates a module information file 182 for a module setup 181 inputted through the template edition screen 800 by use of the GUI function of the overall controller 23. FIG. 16B shows a configuration of the module information file 182.

Figure 17:
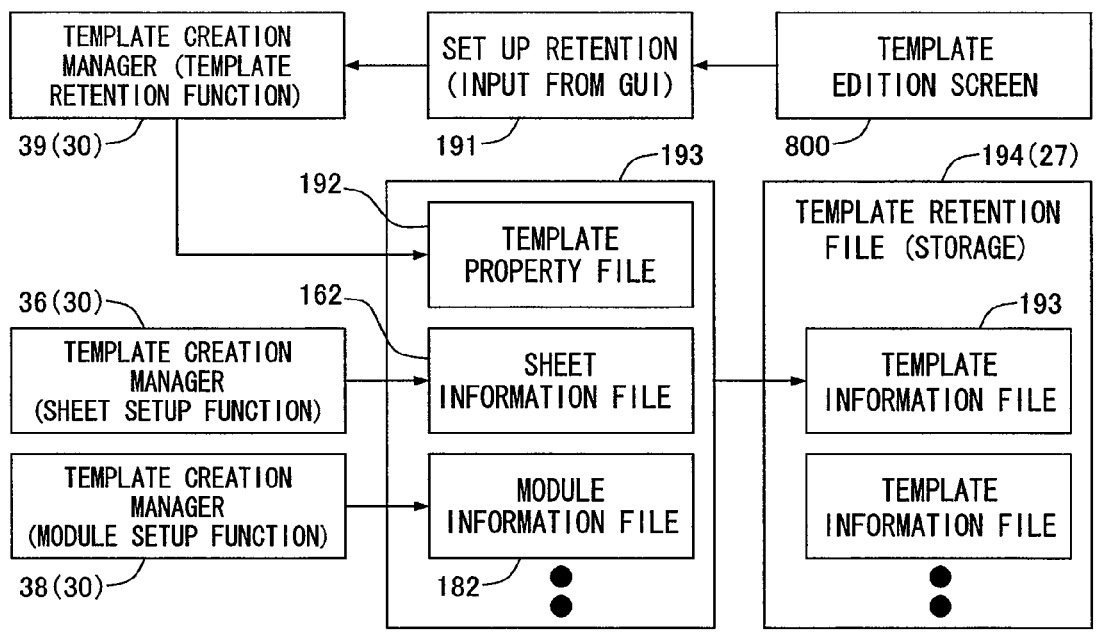
FIGS. 17A and 17B show a relationship between a template retention function included in the template creation manager and a template retention file.
Figure 17B:
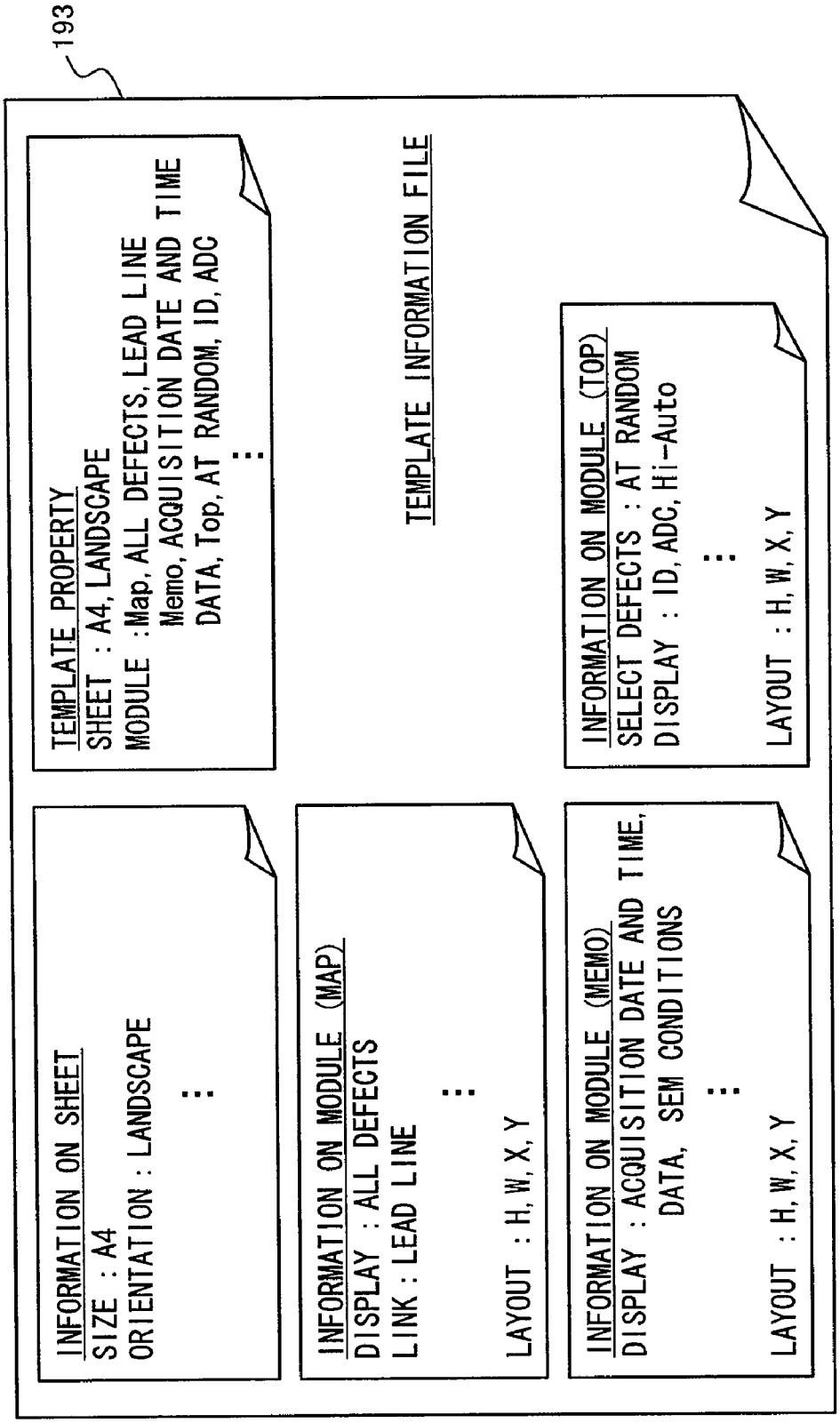

FIGS. 17A and 17B show a relationship between a template retention function included in the template creation manager and a template retention file.

As shown in FIG. 17A, a template retention function 39 in the template creation manager 30 generates a template property file 192 for a retention setup 191 inputted through the template edition screen 800 by use of the GUI function of the overall controller 23. In addition, the template retention function 39 generates a template information file 193 by putting together the generated template property file 192, the sheet information file 162 generated by the sheet setup function 36, and the module information file 182 generated by the module setup function 38, for the purpose of retaining the result of putting the three files together, as an existing output format setup template provided to the storage 27, in a template retention file 194 in the storage 27. FIG. 17B shows a configuration of the template information file 193.

Descriptions will be provided next for a review report 200 which the report outputting function 40 outputs by use of the template information file 193 which has been stored, as the existing output format setup template, in the template retention file 194 in the storage 27.

It should be noted that each pieces of information will be displayed in the form of the corresponding icon image without displaying details of each piece of information in the following descriptions. That is because the purpose of the following descriptions is to describes a result of outputting a review report by use of the template information file 193 which has been stored, as the existing output format setup template, in the template retention file 194 in the storage 27 as shown in FIG. 17.

Figure 18:
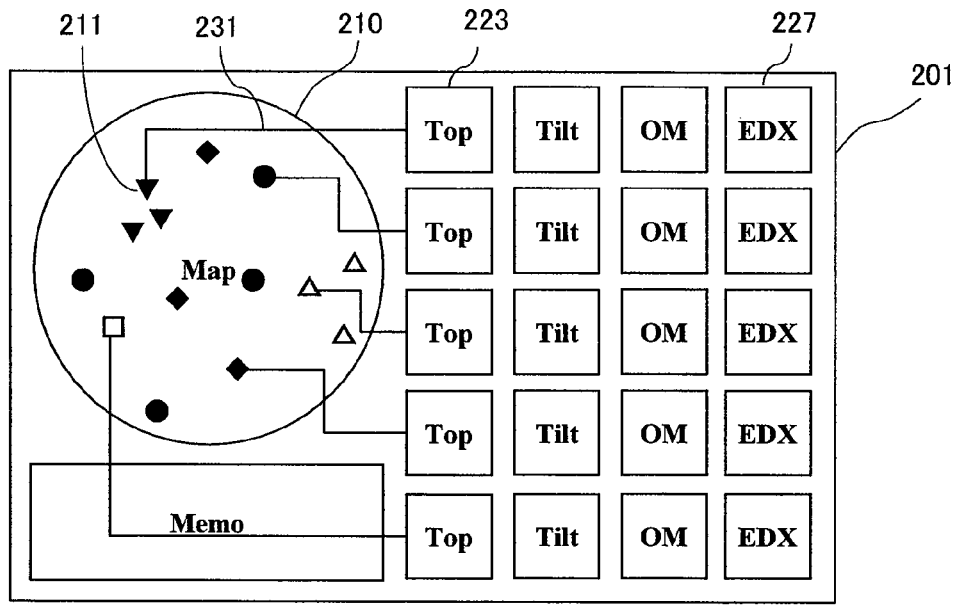
FIGS. 18A and 18B are diagrams each illustrating a result of outputting a review report including a wafer map which a report outputting function outputs.
Figure 18:
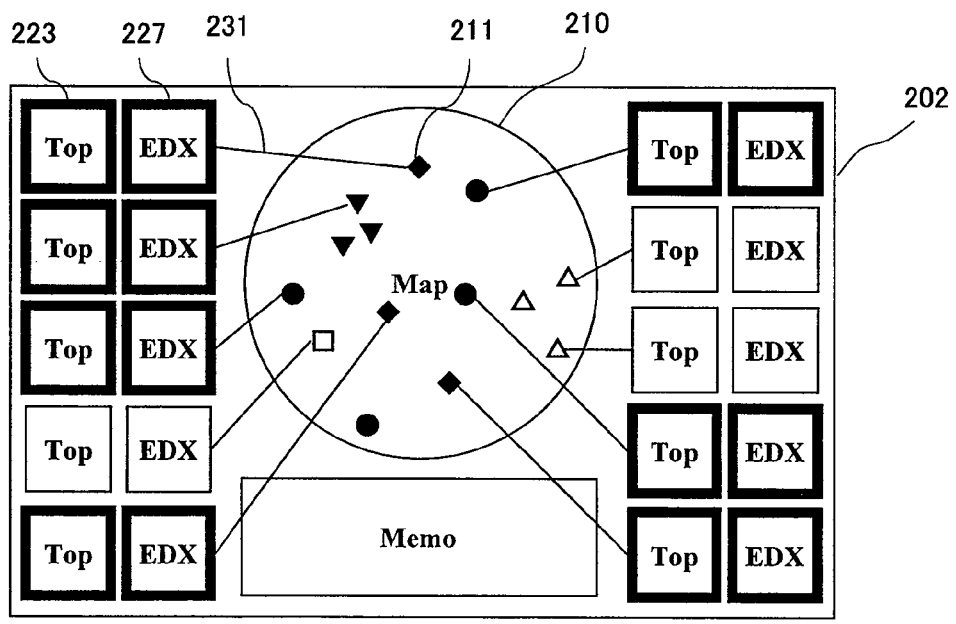

FIGS. 18A and 18B are diagrams each illustrating a result of outputting a review report including a wafer map, the review report being outputted by the report outputting function.

FIG. 18A shows an example of a result of outputting a report in the form of a combination of a wafer map, memo information, Top images, Tilt images, OM images, EDX results.

In the case of a review report 201 as shown in FIG. 18A, defect symbols 211 on a wafer map 210 and Top images 223 are configured to be displayed with the defects symbols 211 connected to Top images 223 with the respective lead lines 231. In a case where the lead line mode 866-1 is selected during the Map-image link setup 866 which has been described by use of FIG. 9, the report outputting function 40 performs this kind of connected display on the basis of the template information file 193 which has been retained in the template retention file 194.

FIG. 18B shows an example of a result of outputting a report in the form of a combination of a wafer map, memo information, Top images, Tilt images, OM images and EDX results as well.

In the case of a review report 202 as shown in FIG. 18B, not only defect symbols 211 on the wafer map 210 are connected to EDX results 227 with the respective lead lines 231, but also the defect symbols 211 are displayed respectively in the same colors as outer peripheries of display frames of the corresponding EDX results 227 and the corresponding Top images 223 are displayed. In a case where the lead line mode 866-1 and the color mode 866-2 are selected during the Map-image link setup 866 which has described by use of FIG. 9, the report outputting function 40 performs this kind of connected display.

When the defect symbols 211, review images and the like are displayed by the report outputting function 40 with the defect symbols 211 connected to the review images and the like by use of the template information file 193 which has been retained in the template retention file 194, this connected display makes it possible for the user to easily judge the correspondence between locations where the defects have occurred and their corresponding images or EDX results visibly.

Figure 19:
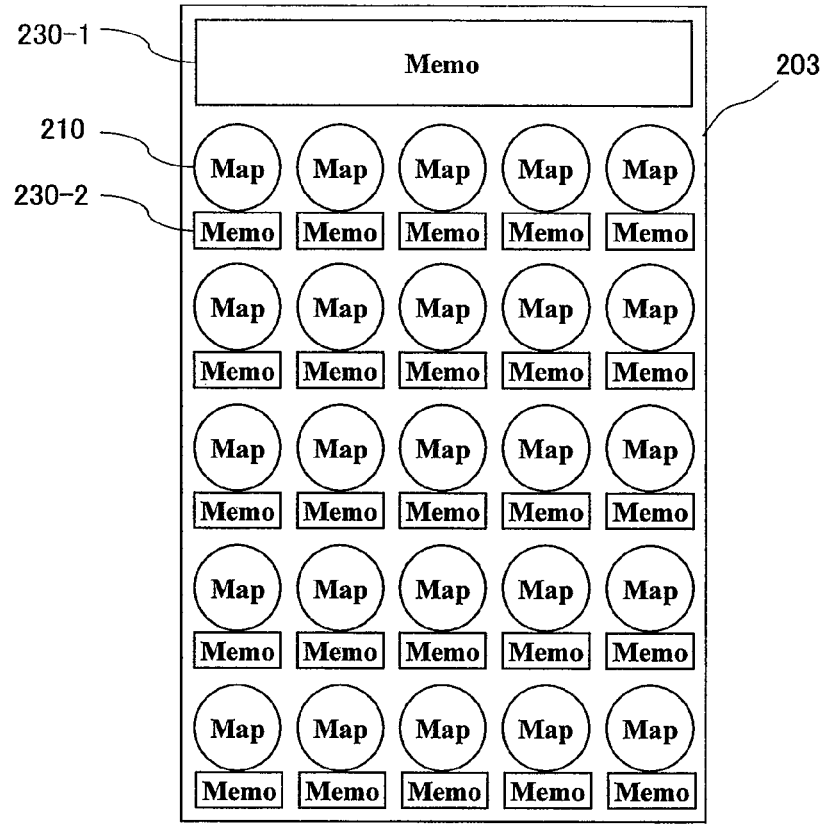
FIGS. 19A and 19B are diagrams each illustrating a result of outputting a review report including memo information which the report outputting function outputs.
Figure 19:
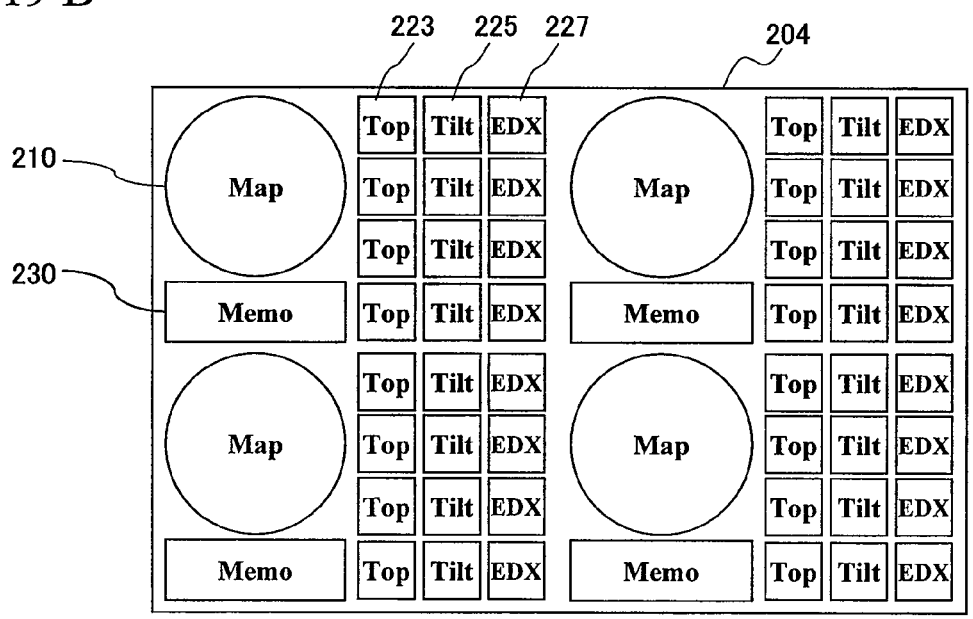

FIGS. 19A and 19B are diagrams each illustrating a result of outputting a review report including memo information which the report outputting function outputs.

FIG. 19A shows an example of a result of outputting a report in the form of combinations each of memo information and a wafer map.

A review report 203 as shown in FIG. 19A makes it possible to effectively use memo information 230-1 for displaying common conditions and comments on the whole, to effectively use the wafer maps 210 for glancing and comparing a spatial pattern in which defects occur, and to effectively use memo information 230-2 for displaying individual conditions of the respective wafer maps. When the plurality of wafer maps 210 are listed up and displayed, this listed display makes it possible to easily judge the defects have a tendency to have a specific spatial pattern, for example, to concentrate on a peripheral portion.

FIG. 19B shows an example of a result of outputting a report in the form of a plurality of combination each of a wafer map 210, memo information 230, Top images 223, Tilt images 225 and EDX results 227.

In the case of a review report 204 as shown in FIG. 19B, this kind of combined display makes it possible for the user to easily compare and examine typical spatial patterns each of the defects, the Top images 223, the Tilt images 225, the EDX results 227 and the like.

Figure 20:
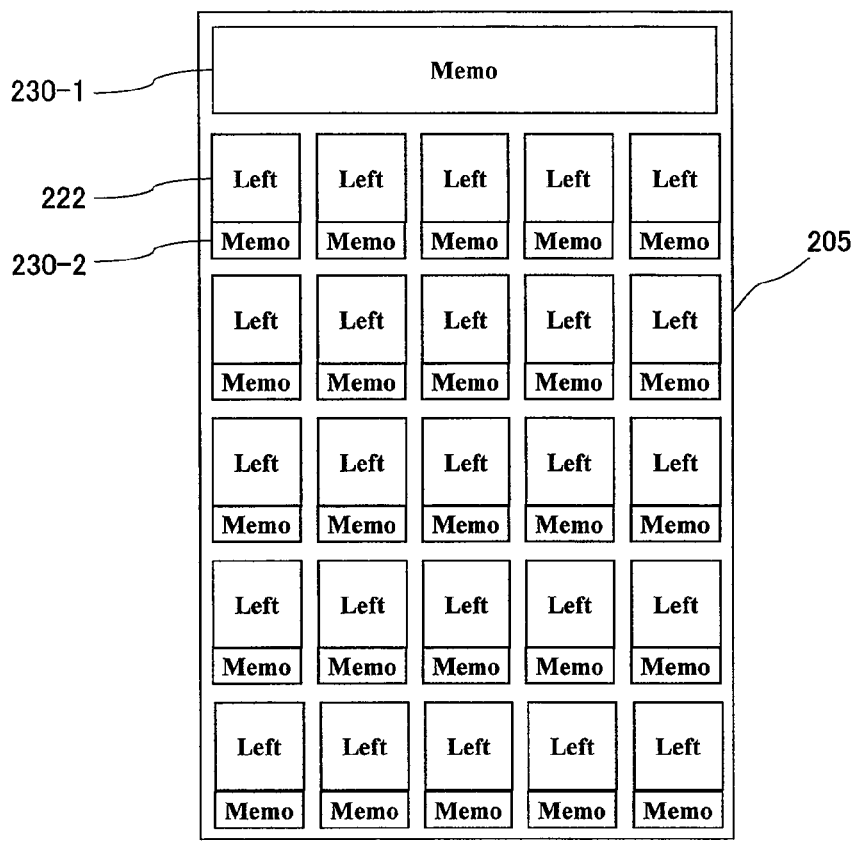
FIGS. 20A and 20B are diagrams each illustrating a result of outputting a report in the form of combinations each of memo information and a Left image.
Figure 20:
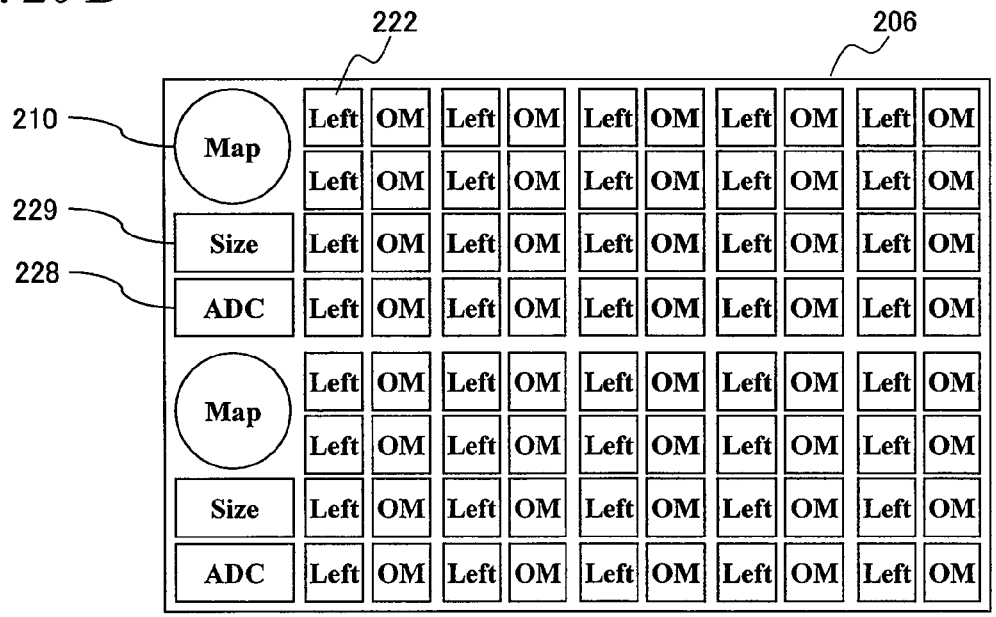

FIGS. 20A and 20B are diagrams each illustrating a result of outputting a report in the form of combinations each of memo information and a Left image.

A review report 205 as shown in FIG. 20A makes it possible to effectively use memo information 230-1 for displaying common conditions and comments on the whole, to effectively use Left images 222 for checking on listed images, and to effectively use memo information 230-2 for displaying individual conditions of the respective images.

A reason why the Left images 222 are selected as representative images is that the Left images 222 are effective for checking on information on convexes and concaves of each defect with a single image. This is the case with Right images, too. Moreover, in a case of spot-shaped defects information on convexes and concaves of the defects is not important, and such defects are more recognizable in SEM images. In this case, the SEM images can be selected.

FIG. 19A shows a format which is selected by focusing on spatial patterns of defects respectively included in a plurality of data sets. This format is effective for comparing the spatial patterns. By contrast, FIG. 20A shows a format which is selected by focusing on defect images. This format is effective for comparing the defects themselves.

A review report 206 as shown in FIG. 20B shows an example of a result of outputting a report in the form of a plurality of data combinations each of a wafer map 210, a size distribution 229, an ADC result 228, Left images 222 and OM images 226. The size distribution 229 is effective for checking on a tendency in the size distribution of defects, and the ADC result 228 is effective for checking on distributions respectively of types of defects which have occurred. The format as shown in FIG. 20B has a larger number of defect images for each piece of data than the format as shown in FIG. 19B, and instead the number of pieces of data to be compared with one another in the format as shown in FIG. 20B is half of the number of pieces of data to be compared with one another in the format as shown in FIG. 19B. This type of format as shown in FIG. 20B is effective for comparing representative images respectively of defect types in detail by use of each two pieces of data. In addition, because the SEM images (the Left images 222 in this case) and the OM images 226 are displayed in a comparative manner, the format as shown in FIG. 20B is effective for determining whether a report from the optical inspection apparatus on defects, such as defects under a film, which are hard to detect through SEM images, is true or false.

Figure 21:
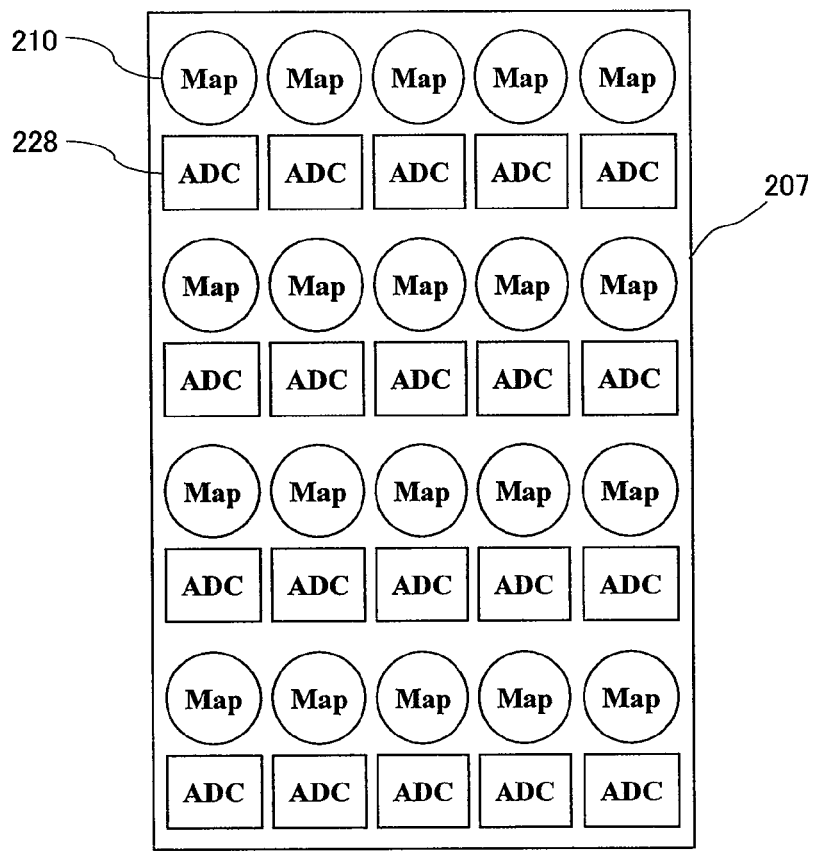
FIGS. 21A and 21B are diagrams each illustrating a result of outputting a report in the form of combinations each of a wafer map and an ADC result.
Figure 21:
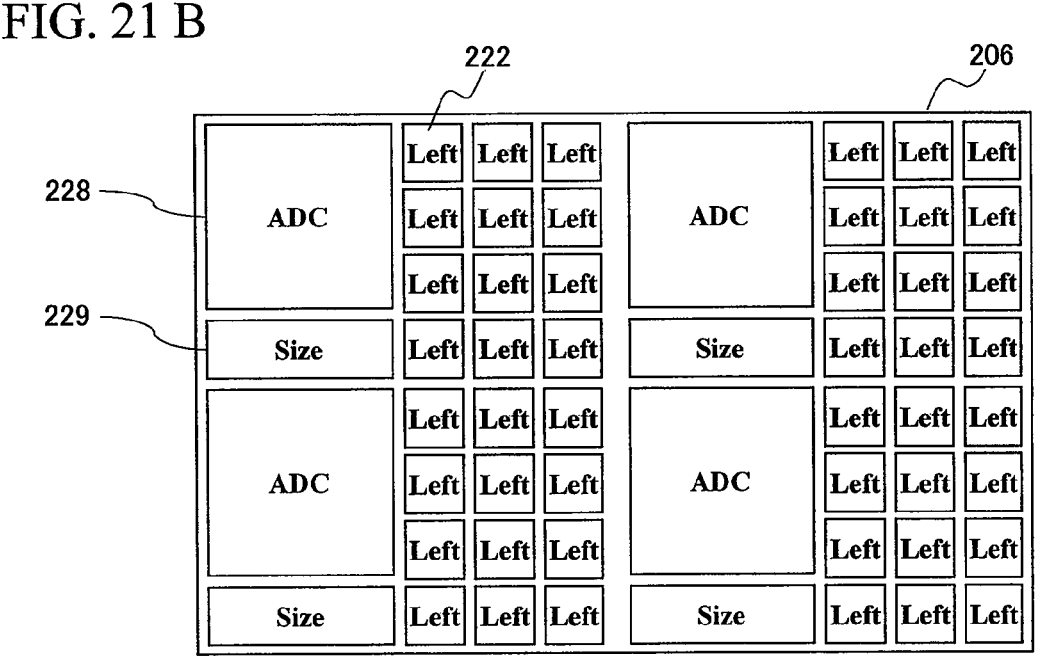

FIGS. 21A and 21B are diagrams each illustrating a result of outputting a report in the form of combinations each of a wafer map and an ADC result.

A review report 207 as shown in FIG. 21A makes it possible for the user to check on distributions of the respective defects with the wafer maps 210, and to check on spatial patterns of the respective types of defects with the ADC results 228. When the wafer maps 210 and the ADC results 228 are displayed in colors corresponding, for example, to the respective types of defects classified with ADC, this display makes it possible to associate the wafer maps 210 with the ADC results 228 in a visible manner. When these pieces of information are displayed in the form of a list, this display makes it possible to easily detect an anomaly, such as the existence of a specific tendency in spatial patterns of the respective defects, from the wafer map 210, and to easily detect an anomaly, such as an anomalous occurrence of specific defects, from the ADC results 228.

A review report 208 as shown in FIG. 21B shows an example of a result of outputting a report in the form of combinations each of an ADC result 228, a size distribution 229 and Left images 222.

This is an example of an output which is selected by focusing on the ADC results 228. The review report 208 is effective for checking on characteristics of sizes of specific types of defects with the size distribution 229, and to check on characteristics of images of specific types of defects with the Left images 222, for example, by focusing on the specific types of defects which have anomalously occurred, on the basis of the ADC results 228. In addition, a glance of these pieces of information with regard to a plurality of pieces of data makes it possible for the user, for example, to compare the anomalous occurrence of specific types of defects with previous cases of anomalous occurrences of defects. If there is a similar case found, the case can be used as information effective for considering a countermeasure against the specific types of defects.

As described above, an optimal format for outputting a report is different from one another depending on what to focus on.

The present invention makes it possible to change formats each for outputting a report freely and easily. This makes it possible to output a report with an optimal format depending on the necessity.

In addition, the foregoing formats each for outputting a report can be stored as templates, and can be registered as samples of templates when apparatuses are going to be shipped. The user can use these samples as existing templates without modifications on the samples, or can edit the samples. Furthermore, an apparatus maker can easily create new formats each for outputting a report as templates without changing programs in the software by use of the present invention. This enables the apparatus maker to cut back on development costs.

The foregoing descriptions have been provided for the defect reviewing apparatus with the configuration which includes all of the parts of the configuration of the report format setup apparatus, by citing the case where the defect reviewing apparatus includes the report outputting function. However, in the case of the systems each of outputting a result of a review process to a network as shown in FIGS. 2A to 2C, the report viewers or the report management servers instead of the defect reviewing apparatuses may include all of the configuration of the report format setup apparatus according to the present invention. Otherwise, the apparatuses constituting the system of outputting the result of the review process to the network may take their shares of the configuration of the report format setup apparatus according to the present invention. In addition, the specific configurations of the screens each for creating or editing a report format are not limited to the specific aspects of the embodiment which have been described above. Any configurations may be adopted as long as they allow the modules as the components constituting a review report to be individually arranged in the output format setup area in an arbitrary manner on the same GUI screen as is displayed by OSD.

What is claimed is:

1. A report format setup apparatus connecting to a defect observation apparatus that acquires a plurality of images of defects on a sample, comprising:
   a display configured to display a module selector to select one of a plurality of modules that represent corresponding components of a result of observation of the sample and configured to display an output format setup area to arrange the modules;
   a pointing device configured to arrange each module in a position on the output format setup area; and
   a template creation manager configured to generate a report format in which the component of the result observation corresponding to each module is arranged in a position corresponding to the position of each module on the output format setup area,
   wherein the template creation manager is further configured to generate, when the report format includes at least a wafer map representing a spatial distribution of the defects on a wafer, a plurality of positions of the defects and the plurality of images of the defects, the report format for displaying a relation between each of the plurality of defect images and a corresponding one of the plurality of defect positions represented by the wafer map.

2. The report format setup apparatus according to claim 1, wherein the template creation manager sets up a respective area to arrange each component of the result of the observation in accordance with the size of the module corresponding to each component on the output format setup area.

3. The report format setup apparatus according to claim 1 further comprising a storage adapted to store data on the report format.

4. The report format setup apparatus according to claim 1, wherein the display displays the output format setup area adjusted in accordance with an orientation of a sheet on which a report based on the report format is output.

5. The report format setup apparatus according to claim 1, wherein the relation is displayed with a lead line connecting each defect image and the corresponding defect position represented by the wafer map, or with a color of a mark representing the corresponding defect position and a color of the outer periphery of each defect image.

6. The report format setup apparatus according to claim 1, wherein the display displays a display setup unit configured to select defects to be output to a report that is based on the report format.

7. A non-transitory storage medium and a program stored in the medium that generates a report format of a defect observation apparatus that acquires a plurality of images of defects on a sample,
   wherein the program performs processes to:
   perform control by displaying a module selector to select one of a plurality of modules that represent corresponding components of a result of observation of the sample and displaying an output format setup area to arrange the modules,
   arrange the modules on the output format setup area in accordance with an operation of an operator,
   generate a report format in which the component of the result of the observation corresponding to each of the plurality of modules is arranged in a position corresponding to the position of each module on the output format setup area, and
   generate, when the report format includes at least a wafer map representing a spatial distribution of the defects on a wafer, a plurality of positions of the defects and the plurality of images of the defects, the report format for displaying a relation between each of the plurality of defect images and a corresponding one of the plurality of defect positions represented by the wafer map.

* * * * *

UNITED STATES PATENT AND TRADEMARK OFFICE
CERTIFICATE OF CORRECTION

| | |
|---|---|
| PATENT NO. | : 8,341,518 B2 |
| APPLICATION NO. | : 12/901954 |
| DATED | : December 25, 2012 |
| INVENTOR(S) | : Hirai |

It is certified that error appears in the above-identified patent and that said Letters Patent is hereby corrected as shown below:

Title Page, Item "(45) Date of Patent:" there should be an asterisk denoting that a Terminal Disclaimer was filed as follows, *Dec. 25, 2012.

On the Title Page:

The first or sole Notice should read --

Subject to any disclaimer, the term of this patent is extended or adjusted under 35 U.S.C. 154(b) by 17 days.

Signed and Sealed this
Nineteenth Day of November, 2013

Teresa Stanek Rea
*Deputy Director of the United States Patent and Trademark Office*